(12) United States Patent
Maekawa et al.

(10) Patent No.: US 6,936,403 B2
(45) Date of Patent: Aug. 30, 2005

(54) RECORDING MEDIUM

(75) Inventors: Yukio Maekawa, Tokyo (JP); Tatsuo Heki, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 215 days.

(21) Appl. No.: 10/315,227

(22) Filed: Dec. 10, 2002

(65) Prior Publication Data

US 2003/0174638 A1 Sep. 18, 2003

(30) Foreign Application Priority Data

Dec. 12, 2001 (JP) ........................................ 2001-379215

(51) Int. Cl.$^7$ ................................................ G11B 7/26
(52) U.S. Cl. ............................ 430/270.16; 430/270.11; 430/945; 428/64.3; 428/64.5
(58) Field of Search ........................... 430/945, 270.11, 430/270.12, 270.13, 270.16; 428/64.3, 64.5

(56) References Cited

U.S. PATENT DOCUMENTS 5,080,947 A * 1/1992 Yamada et al. ............ 428/64.4
2001/0022769 A1 * 9/2001 Waki et al. .................. 369/172
2002/0006580 A1 * 1/2002 Ishimaru et al. ........ 430/270.13

FOREIGN PATENT DOCUMENTS

| EP | 0023102 | * | 1/1981 |
| EP | 1139161 | * | 10/2001 |
| JP | 58-008695 | * | 1/1983 |
| JP | 62-270386 | * | 11/1987 |
| JP | 10-320772 | | 12/1998 |
| JP | 2000-48340 | | 2/2000 |
| JP | 2000-163804 | * | 6/2000 |
| JP | 2001-167431 | | 6/2001 |
| JP | 2001-184620 | | 7/2001 |
| JP | 2001-184744 | | 7/2001 |

OTHER PUBLICATIONS

Machine translation of jp 2000–048340.*
Machien translation of jp 2001–184744.*

* cited by examiner

*Primary Examiner*—Martin Angebranndt
(74) *Attorney, Agent, or Firm*—Sughrue Mion, PLLC

(57) ABSTRACT

A recording medium which has, formed on a substrate, a recording layer that contains spherical grains having a substantially uniform grain size and including inorganic grains. Preferably, an undercoat layer having no substantial information recording ability is formed between the substrate and the recording layer.

18 Claims, 1 Drawing Sheet

RECORDING MEDIUM

BACKGROUND OF THE INVENTION

1. Field of the Invention

The present invention relates to a high-density recording medium, and more precisely to a recording medium having the recording layer containing spherical grains that include inorganic grains.

2. Description of the Related Art

Magnetic recording technology, which is a typical technology for recording media, has some excellent technical advantages which other recording systems do not have. Characteristic advantages thereof are that it allows repeated use of recording media, it facilitates digitization of signals for easy combination with peripheral appliances thereby allowing easy system construction, and it allows easy correction of signals. Having such advantages, magnetic recording technology is therefore widely utilized in various fields including video, audio, computers, and the like.

In order to allow practical use of digital recording systems that realize both improved sound quality and image quality for information data, and further development of image-recording systems suited for high-definition TV, magnetic recording media which enable recording and reproduction of even shorter wavelength signals than those for conventional systems and which ensure good reliability and durability even when a relative speed of the recording medium with respect to a head on which they run is elevated, are presently desired. Desire for development of large-scale digital recording media capable of storing larger amounts of data for use in computers is also increasing.

Given the situation described above, there is demand for microfabrication of recording cells, which are the information-writing units in such recording and reproduction devices and recording media. However, there are often problems in that recording in such microfabricated cells may be unstable and generate noise due to the interaction of magnetic grains in the cells.

To solve the problems described, a magnetic recording medium has been proposed in which magnetic grains on a substrate are microfabricated and are isolated from other grains (S. Y. Chou, et al., *J. Appl. Phys.*, 76 (1994), pp. 6673–6675).

Japanese Patent Application Laid-open (JP-A) No. 10-320772 discloses a method for producing such a magnetic recording medium in which the magnetic grains are isolated from other grains. The method comprises using fine particles, which serve as a mask, are two-dimensionally aligned on a substrate, and have a diameter of from a few nanometers to a few micrometers, to thereby fabricate the intended magnetic recording medium in which the magnetic grains have a reduced grains size distribution and are isolated from other grains on the substrate. However, the method requires additional steps of reactive ion etching and mask vapor deposition, and is therefore inevitably expensive.

JP-A No. 2000-48340 discloses a method that comprises preparing, in a solvent containing an organic stabilizer, a solvent dispersion of magnetic grains, which are produced separately and which have a substantially uniform grain size such that a standard deviation in grain size is smaller than 10% of a mean grain size thereof, then applying the thus-prepared dispersion onto a substrate and evaporating the solvent to thereby form, through such wet chemical treatment, a layer of the magnetic grains, which are coated with the organic stabilizer and are substantially uniformly spaced apart from neighboring ones on the substrate. In the method, the organic stabilizer is subsequently removed by dry vacuum treatment carried out in a plasma reinforced CVD device, and then a protective film is formed on the magnetic layer through treatment in the plasma reinforced CVD device or a reactive sputtering device.

However, the method still requires the complicated steps of preparing magnetic grains having a substantially uniform grain size with no aggregation, then coating the magnetic grains with an organic stabilizer through wet chemical treatment, and finally removing the organic stabilizer in a dry vacuum system. In addition, in the method, control of a distance between grains depends on the organic stabilizer used. Therefore, another problem with the method is that it requires a specifically controlled condition for forming the layer of the two-dimensionally aligned magnetic grains on the substrate.

JP-A No. 2001-167431 discloses another method of forming a layer of magnetic metal grains on a substrate, which comprises applying a dispersion of magnetic metal grains onto a substrate by of spin coating to thereby embed the magnetic metal grains in recording bits that are formed in the substrate through semiconductor lithography. According to this method as well, it is necessary to produce magnetic grains that have a substantially uniform grain size with no aggregation. Another problem with the method is that it is specifically defined by the semiconductor lithography required to form the recording bits in the substrate.

JP-A Nos. 2001-184620 and 2001-184744 disclose still another method of fabricating a recording medium with recording grains being spaced apart from neighboring ones in a controlled manner, which comprises coating information-recording grains having a substantially uniform grain size with a specific organic material that interacts with the grains to thereby specifically isolate the thus-coated grains from each other.

However, the method is still problematic in that it requires troublesome production of information-recording grains having a substantially uniform grain size, and control of a distance between grains depends on a type of organic stabilizer used. Therefore a condition for forming a layer of two-dimensionally aligned grains is specifically defined. Further, in the method, it is considered preferable to etch the two-dimensionally aligned grains in the formed layer to some degree through reactive ion-etching treatment to thereby space the neighboring grains apart from each other. Thus, the method involves various problems, such as requiring troublesome additional steps.

SUMMARY OF THE INVENTION

Given that situation as above, the object of the present invention is to provide a recording medium which is so designed that the inorganic grains of, for example, a metal, an intermetallic compound, an alloy or a metal chalcogenide in the recording layer thereof are isolated from the others with no aggregation and that the space between the neighboring grains in the recording layer is specifically controlled.

Having produced substantially monodispersed inorganic grains of, for example, metals, intermetallic compounds, alloys or metal chalcogenides, we, the present inventors have assiduously studied various recording media for effectively controlling the spaces between the neighboring grains in the recording layer thereof, and, as a result, have found that, when a predetermined amount of metal ions are fixed inside spherical grains having the ability to coordinate with metal ions inside them and having a substantially uniform grain size and when the resulting grains are reduced or reacted with a specific reagent, then the spherical grains shall include inorganic grains fixed therein, and have further found that, when a recording layer which contains the spherical grains of the type are formed on a substrate, then the substantially monodispersed inorganic grains therein are isolated from the others and the distance between the neighboring grains on the recording layer is thereby specifically controlled. On the basis of these findings, we have completed the specifically-designed recording medium of the present invention.

Specifically, the object of the present invention is attained by the means mentioned below.

A first embodiment of the present invention is a recording medium comprising a substrate and a recording layer disposed on the substrate, the recording layer including spherical grains, which have a substantially uniform grain size and include inorganic grains.

A second embodiment of the present invention is the recording medium, according to the first embodiment, wherein the inorganic grains are substantially monodispersed and have a grain size of at most 10 nm.

A third embodiment of the present invention is the recording medium, according to the first embodiment, further comprising an undercoat layer disposed between the substrate and the recording layer, the undercoat layer including a material, which has substantially no information recording ability.

A fourth embodiment of the present invent invention is the recording medium, according to the first embodiment, wherein the spherical grains include a dendrimer.

A fifth embodiment of the present invention is the recording medium, according to the fourth embodiment, wherein the dendrimer comprises a structure capable of coordinating with a metal.

A sixth embodiment of the present invention is the recording medium, according to the fourth embodiment, wherein the dendrimer includes at least one of trimethyleneimine and amidamine.

A seventh embodiment of the present invention is the recording medium, according to the fourth embodiment, wherein the dendrimer contains a π-conjugated polyarylazomethine that has a branched structure.

An eighth embodiment of the present invention is the recording medium, according to the seventh embodiment, wherein the π-conjugated polyarylazomethine is branched except in an aromatic ring moiety thereof.

A ninth embodiment of the present invention is the recording medium, according to the fourth embodiment, wherein the dendrimer comprises at least one selected from the group consisting of the following compounds (1) to (10):

Dendrimer (1):

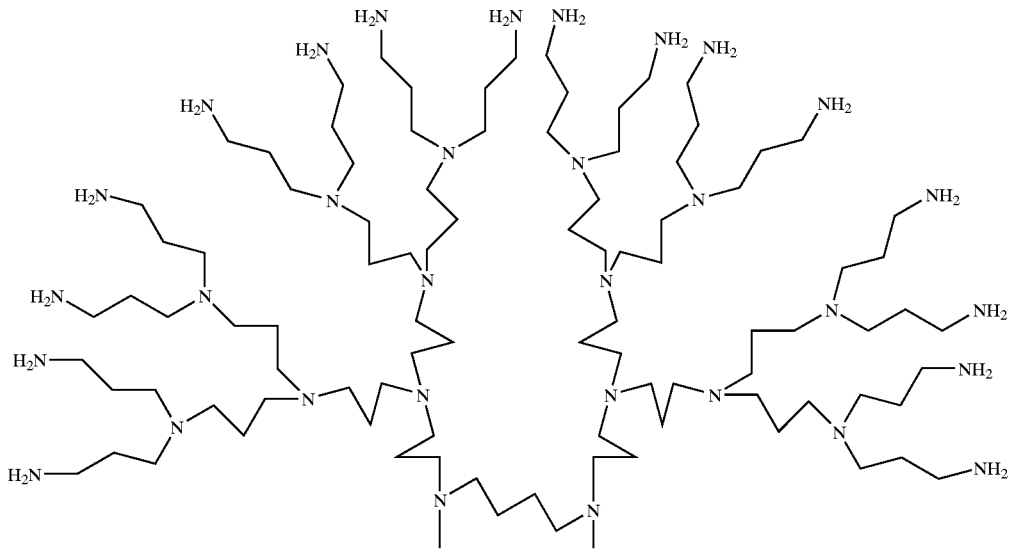

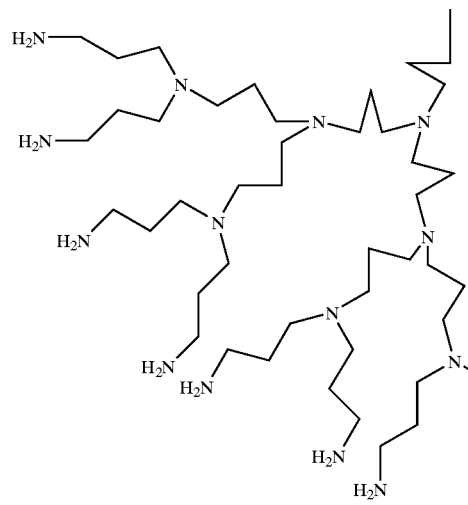
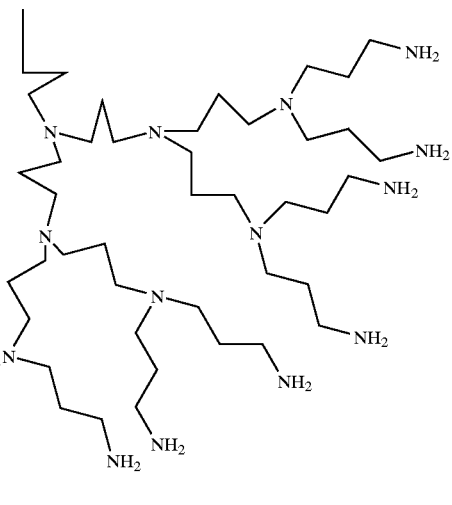
Dendrimer (2):
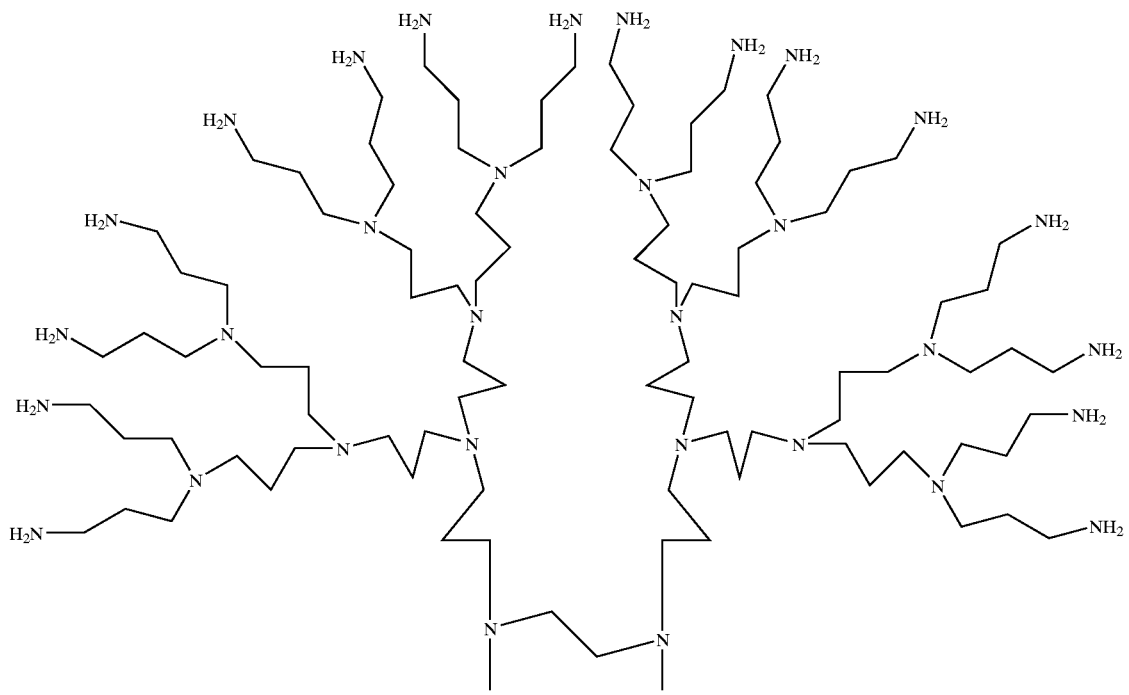

-continued
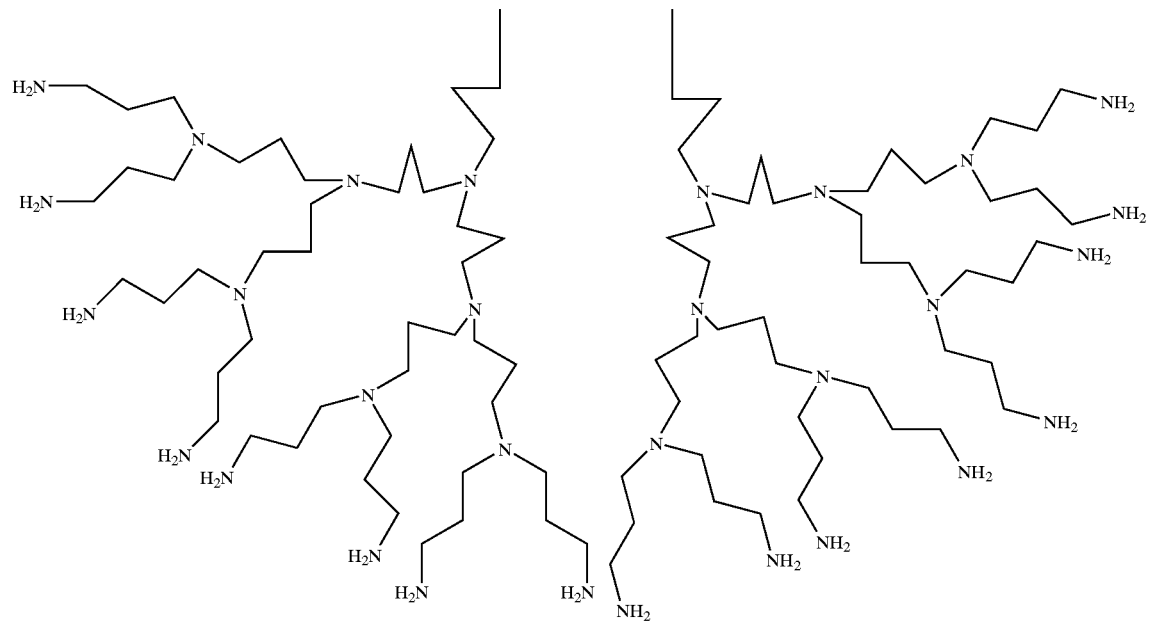
Dendrimer (3):
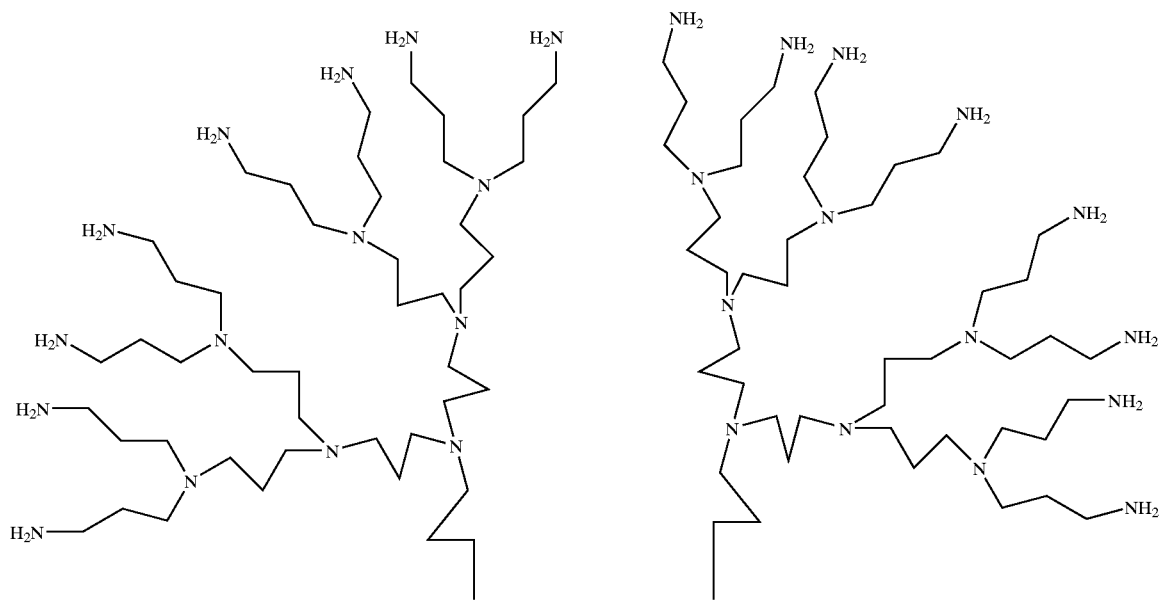

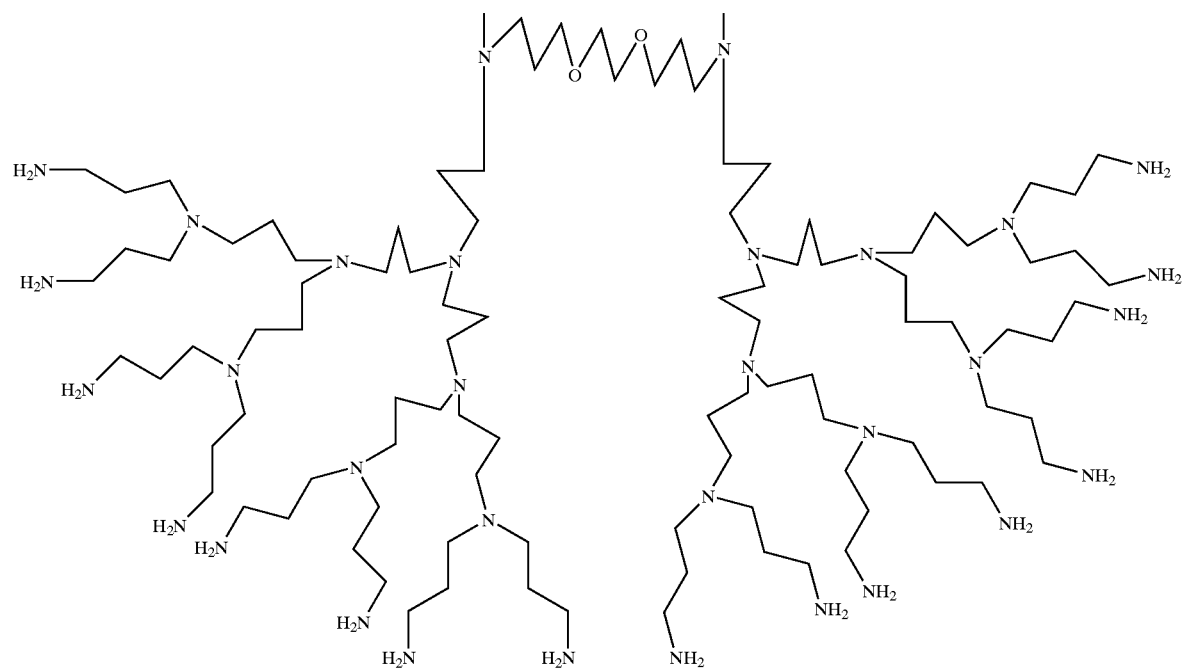
Dendrimer (4):
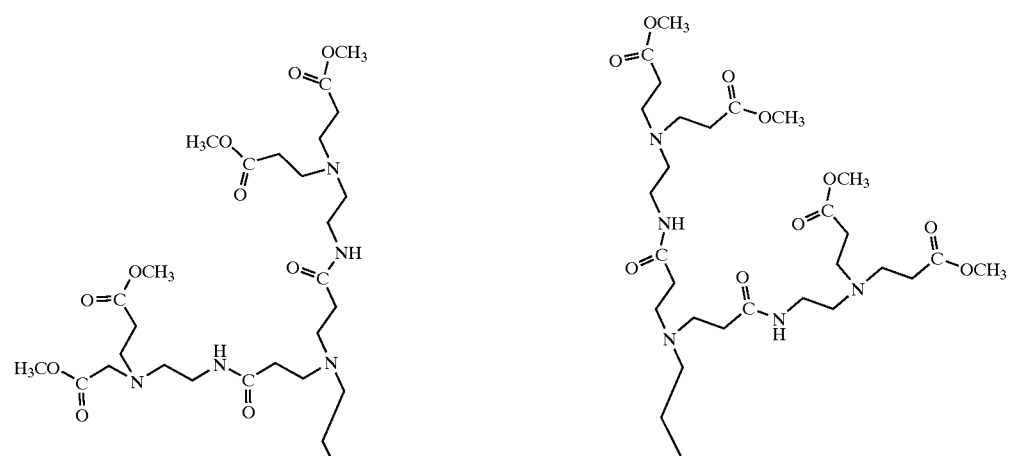

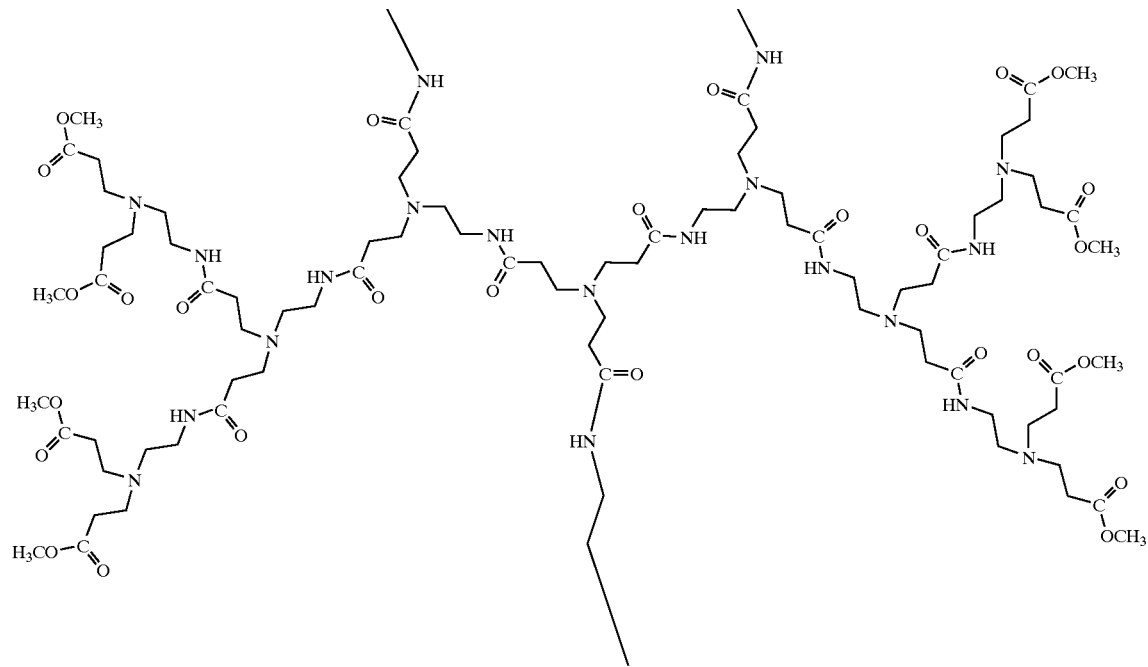
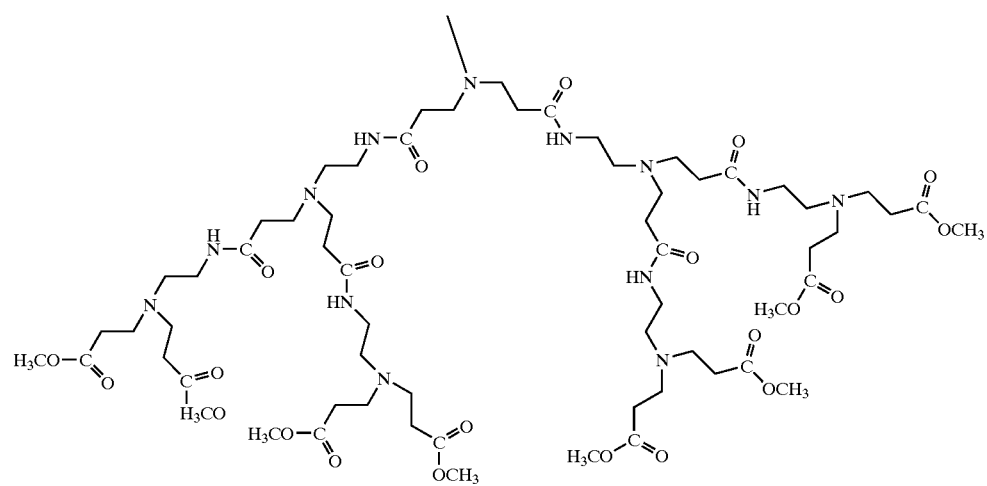

Dendrimer (5):
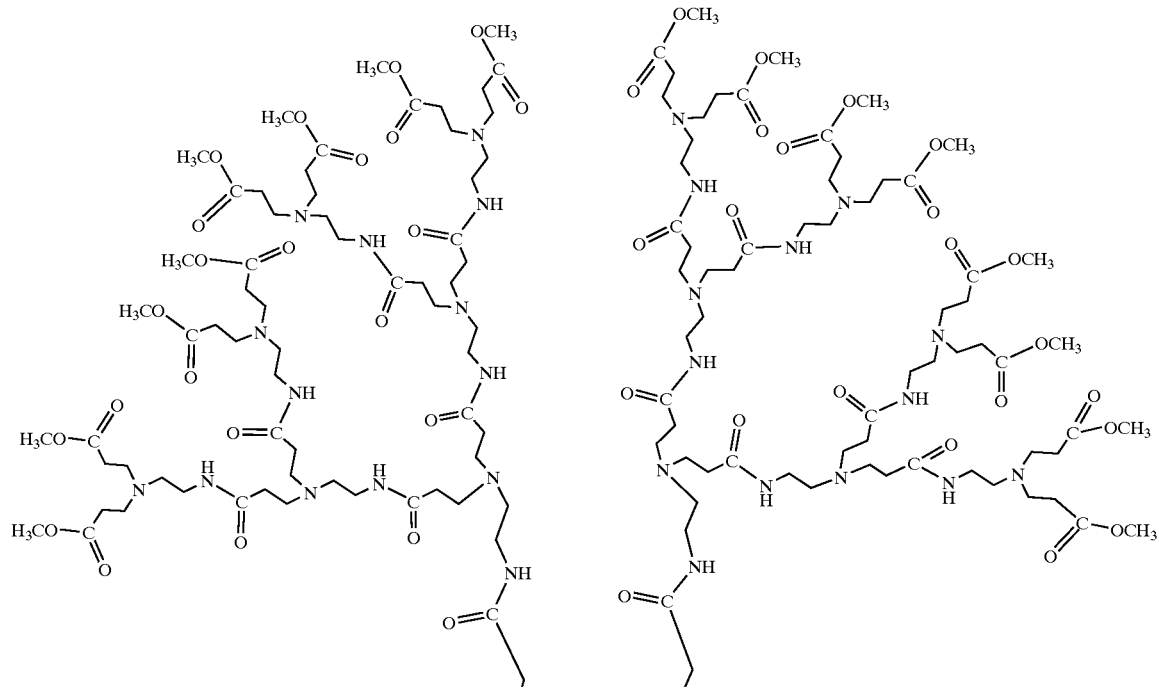
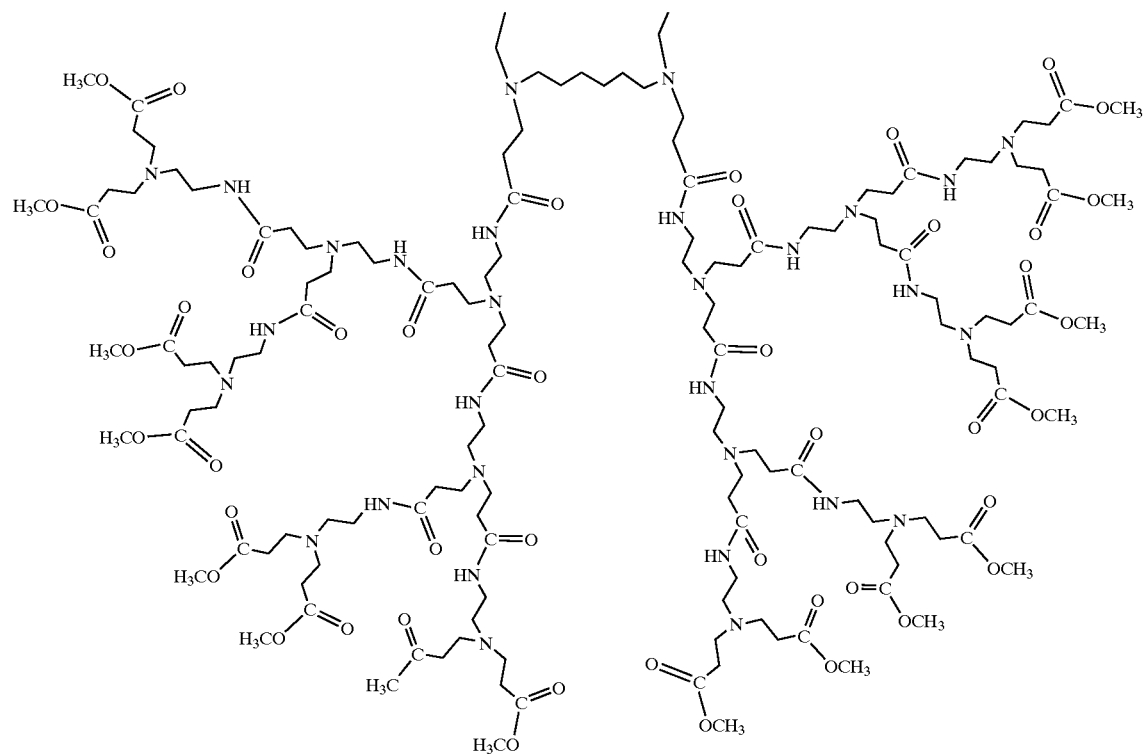

Dendrimer (6):
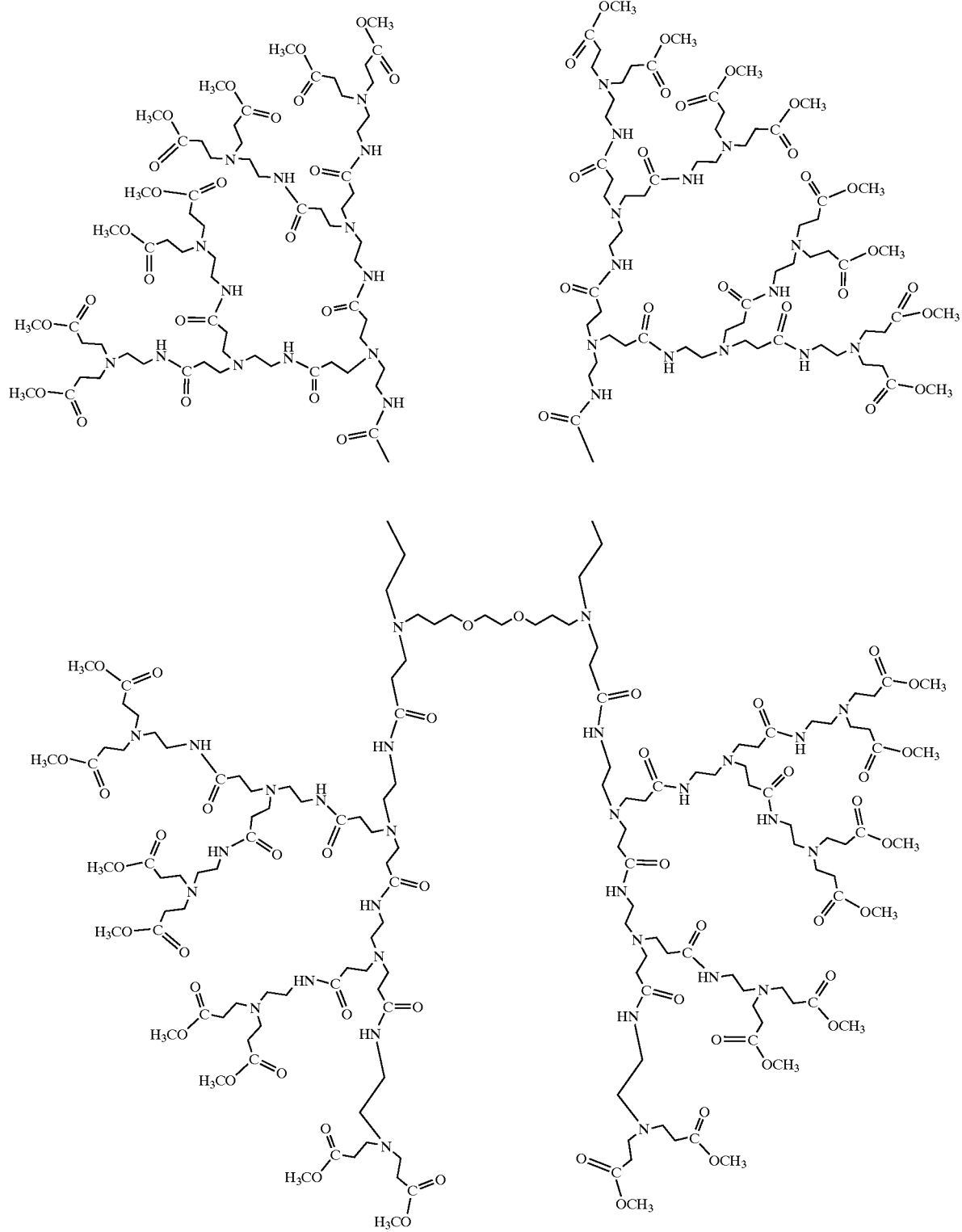

Dendrimer (7):
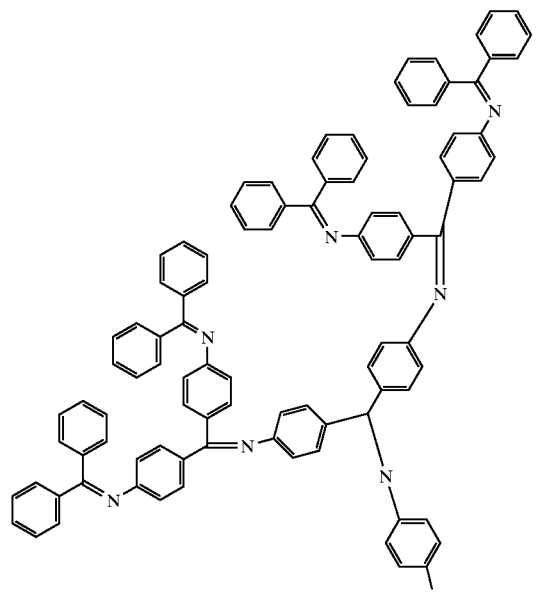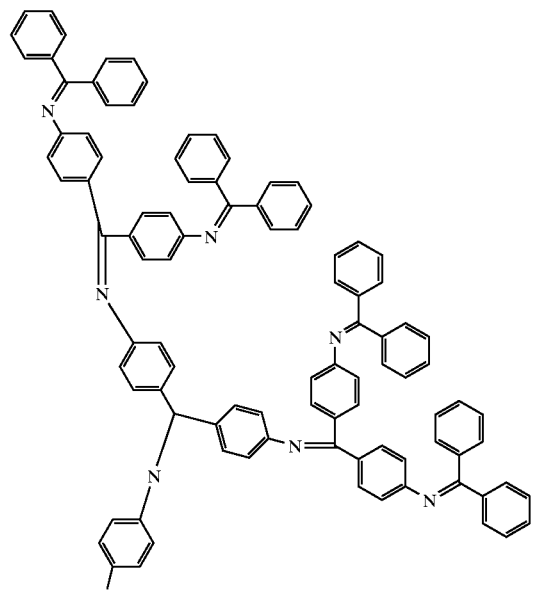
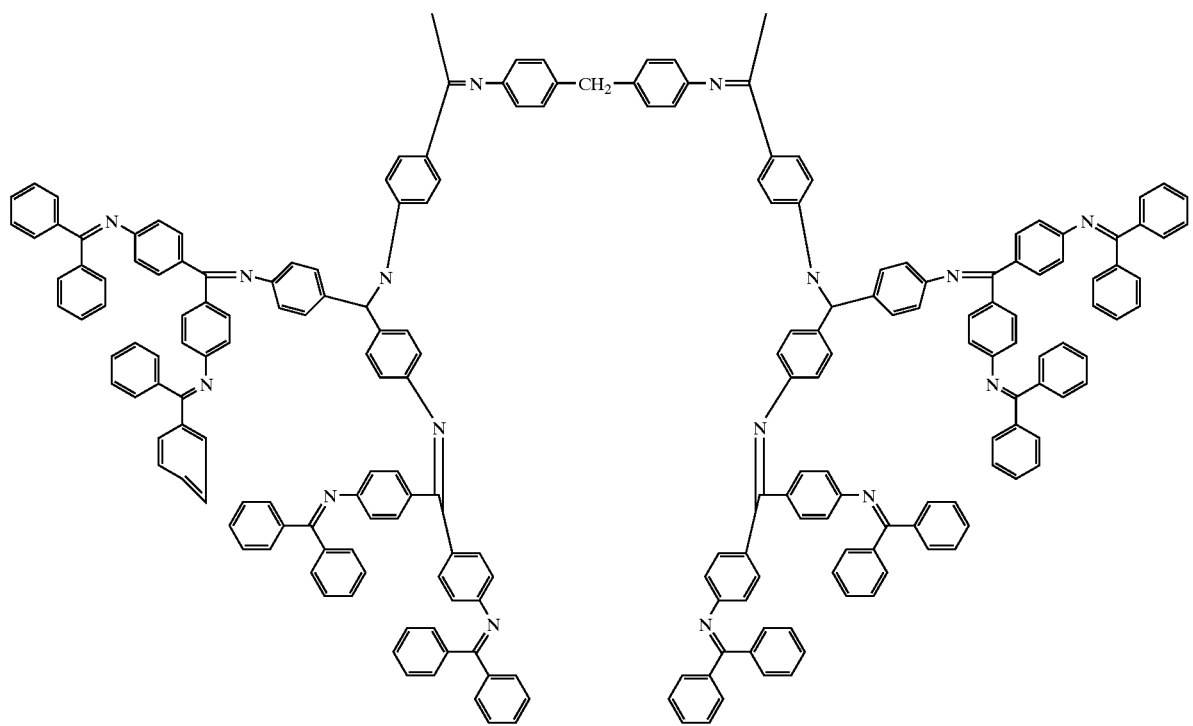

Dendrimer (8):
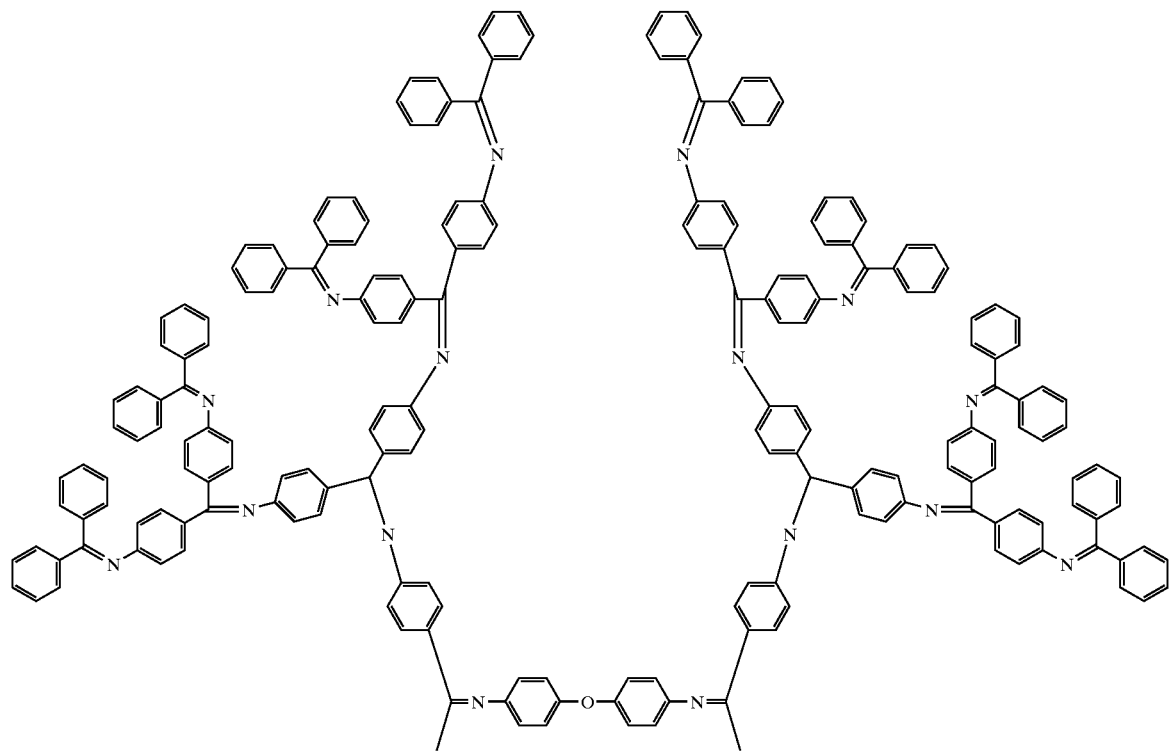
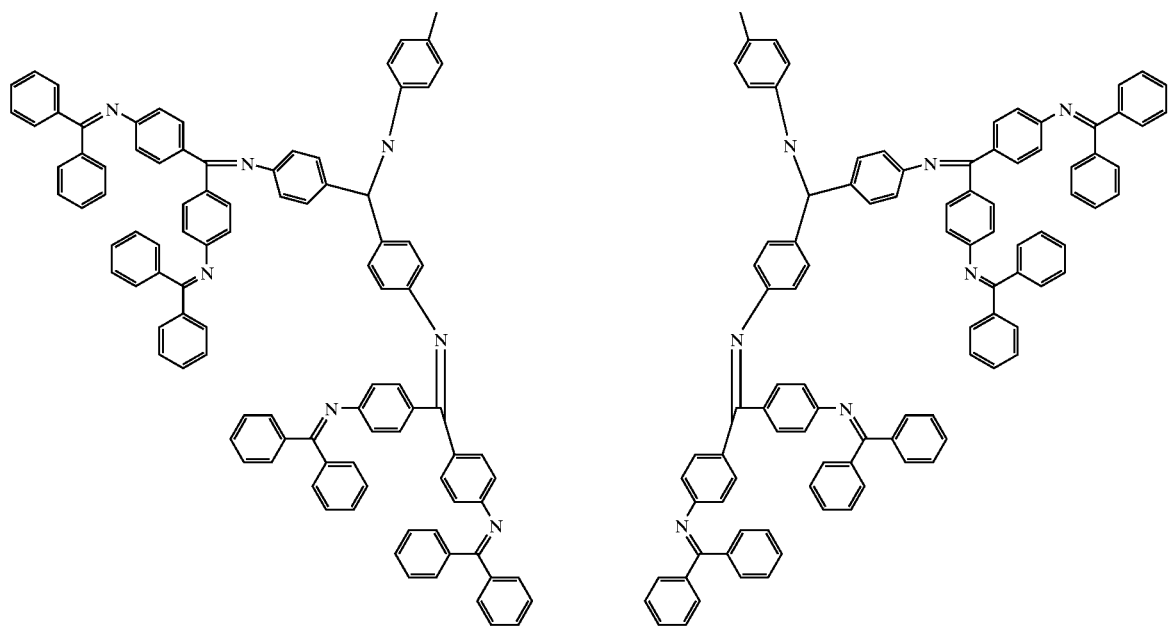

Dendrimer (9):
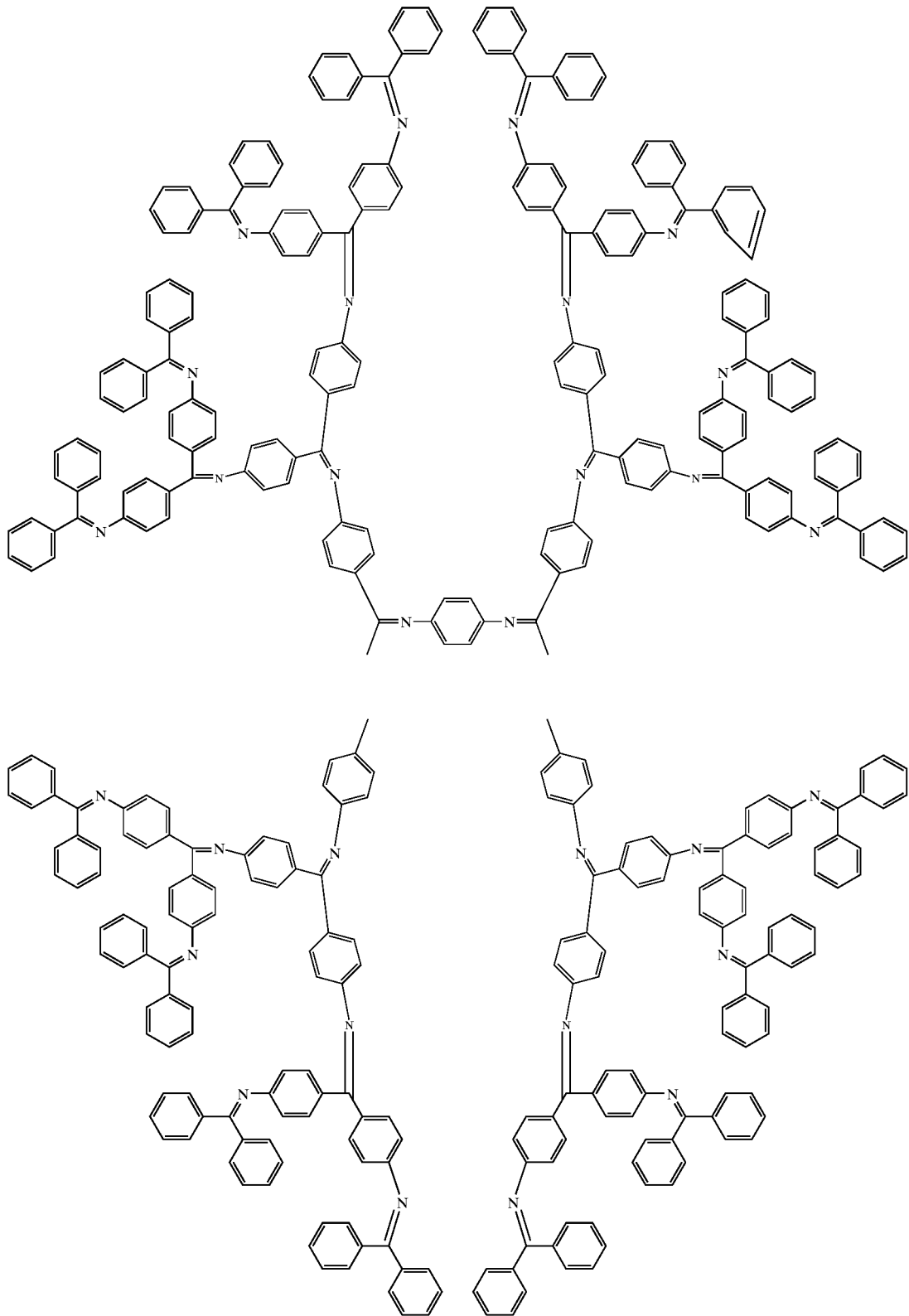

Dendrimer (10):

-continued

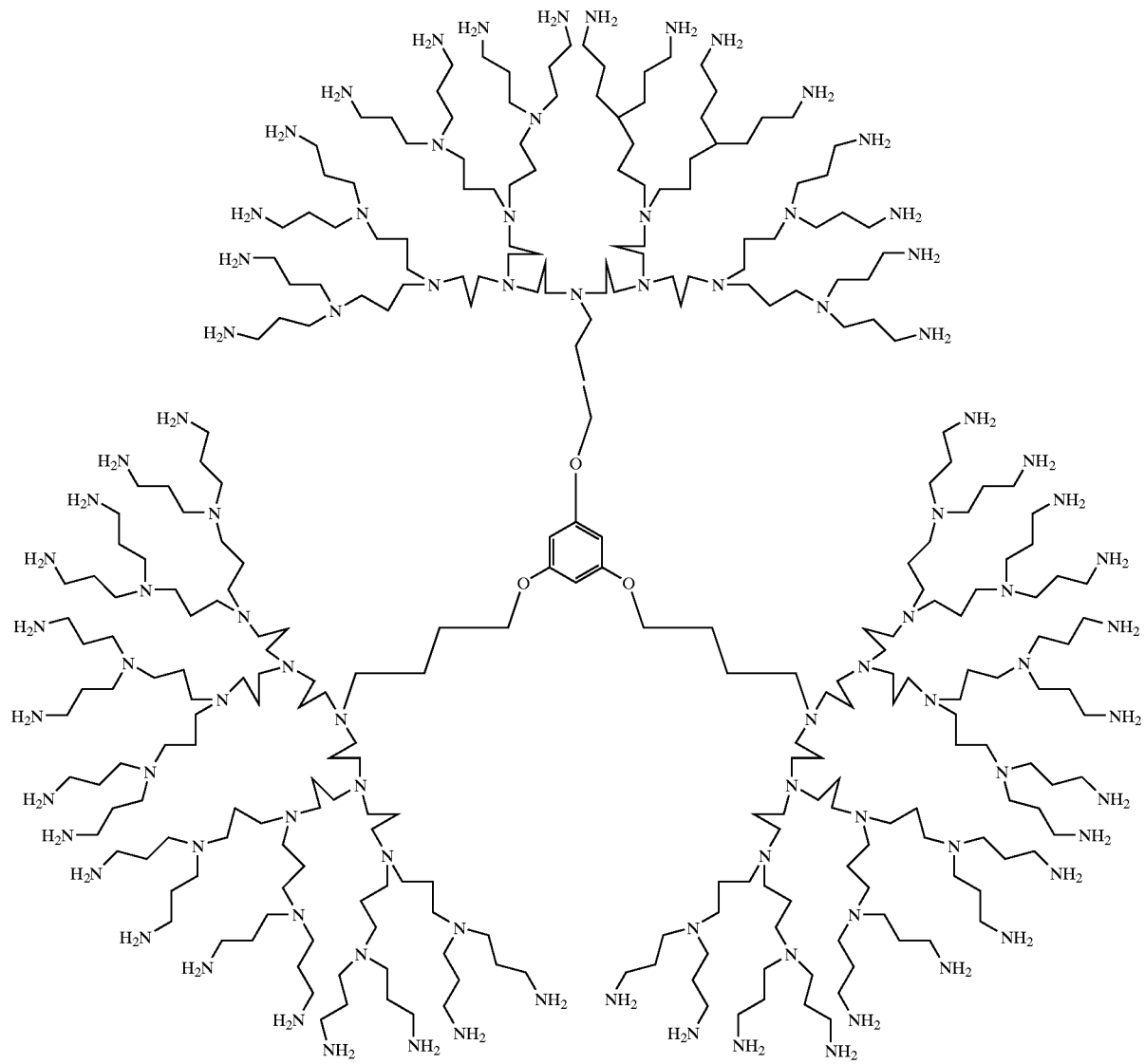

A tenth embodiment of the present invention is the recording medium, according to the first embodiment, wherein the spherical grains contain a functional group capable of forming a covalent bond with at least one of other spherical grains, an organic material other than said other spherical grains, and an inorganic material other than said other spherical grains.

An eleventh embodiment of the present invention is the recording medium, according to the first embodiment, wherein the inorganic grains contain at least one selected from the group consisting of a metal, an intermetallic compound, an alloy, a metal chalcogenide and a magnetic material.

A twelfth embodiment of the present invention is the recording medium, according to the eleventh embodiment, wherein the metal is selected from the group consisting of Co, Fe and Ni.

A thirteenth embodiment of the present invention is the recording medium, according to the eleventh embodiment, wherein the metal is selected from the group consisting of Au, Pd and Pt.

A fourteenth embodiment of the present invention is the recording medium, according to the eleventh embodiment, wherein the intermetallic compound is selected from the group consisting of Co, Fe, Ni, Cr, Mn, Sm, Nd, Pd, Pt and B.

A fifteenth embodiment of the present invention is the recording medium, according to the eleventh embodiment, wherein the alloy is a binary alloy or a ternary alloy, of elements selected from the group consisting of Co, Fe, Ni, Cr, Mn, Sm, Nd, Pd, Pt and B.

A sixteenth embodiment of the present invention is the recording medium, according to the eleventh embodiment, wherein the alloy is selected from the group consisting of Sb—Se, Sb—Te, Ga—Se, Te—Se, Te—Se—Sb, Te—Ga—Se, Te—Ge—Sn, Te—As—Ge, and Ge—Sb—Te.

A seventeenth embodiment of the present invention is the recording medium, according to the eleventh embodiment, wherein the metal chalcogenide is an Fe oxide containing at least one of Co and Ni.

An eighteenth embodiment of the present invention is the recording medium, according to the eleventh embodiment, wherein the magnetic material is selected from barium ferrite and strontium ferrite.

A nineteenth embodiment of the present invention is the recording medium, according to the first embodiment, wherein a protective layer is disposed on the recording layer.

A twelfth embodiment of the present invention is the recording medium, according to the first embodiment, wherein the substrate contains a material selected from the group consisting of polyesters, polyolefins, cellulose triacetate, polycarbonate, polyamide, polyimide, polyamidimide, polysulfone, polybenzoxazole, aluminium and glass, and has, on a surface thereof, a polar group selected from the group consisting of —OH, —COOH, —NH$_2$, —CONH$_2$, —SO$_3$H, and —PO$_3$H.

In the recording medium of the present invention, used are spherical grains having the ability to coordinate with metal inside them and having a substantially uniform grain size. In this, metal ions are fixed inside the spherical grains, and then the spherical grains are reduced or reacted with a specific reagent whereby substantially monodispersed inorganic grains of, for example, a metal, an intermetallic compound, an alloy, a metal chalcogenide or a magnetic material are formed inside the spherical grains. The size of the inorganic grains to be included inside the spherical grains is defined by specifically controlling the amount of the metal ions to be fixed inside the spherical grains.

In the present invention, the space between the neighboring inorganic grains is controlled by aligning spherical grains including inorganic grains and having a substantially uniform grain size.

Accordingly, as compared with the ordinary technique of using an organic stabilizer to coat the grains therewith to thereby isolate the thus-coated grains from each other that has heretofore been disclosed, the information recording medium of the present invention has the advantages of uniform interaction of the grains with each other in the recording layer, noise reduction and increase in S/N ratio.

Preferably, the recording layer is formed on the substrate via an undercoat layer of substantially no information recording ability. In the preferred case, the undercoat layer reduces the influence of the surface roughness and rough hillocks, if any, of the substrate on the recording capacity of the medium.

Also preferably, an abrasion-resistant film such as a protective layer is formed on the recording layer. With that, the abrasion resistance of the recording layer is greatly improved.

DESCRIPTION OF THE PREFERRED EMBODIMENTS

Figure 1A:
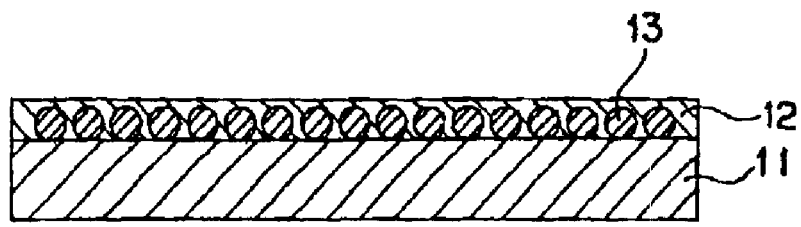
FIG. 1A, FIG. 1B and FIG. 1C each are a cross-sectional view showing the outline of some preferred embodiments of the recording medium of the present invention. In these drawings, 11 indicates a substrate; 12 indicates a recording layer; 13 indicates a spherical grain; 14 undercoat layer; 15 indicates a protective layer; and 16 indicate a back layer.
Figure 1B:
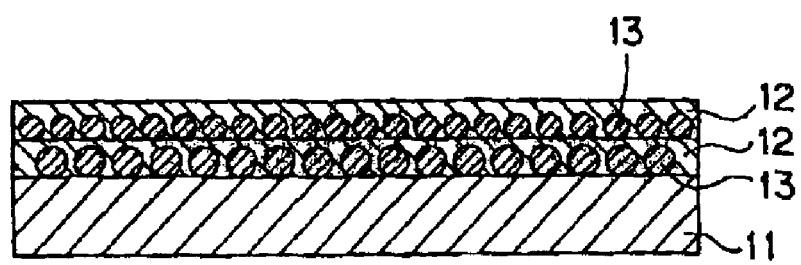
Figure 1C:
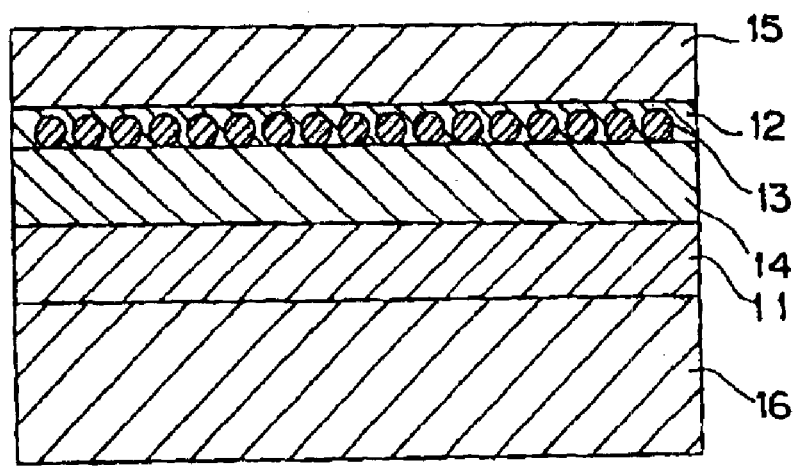

Some preferred embodiments of the recording medium of the present invention are described hereinunder with reference to FIGS. 1A to 1C each showing a cross-sectional view thereof.

FIG. 1A shows one preferred embodiment of the recording medium of the present invention, which has a recording layer 12 on a substrate 11 and in which the recording layer 12 contains spherical grains 13 that include inorganic grains of, for example, a metal, an intermetallic compound, an alloy, a metal chalcogenide or a magnetic material and that have a substantially uniform grain size.

FIG. 1B shows another preferred embodiment of the recording medium of the present invention, in which two recording layers 12 are formed on one substrate 11. In this case that has at least two recording layers 12 formed on one substrate, the multiple recording layers 12 may be the same or different in point of their recording system.

FIG. 1C shows still another embodiment of the recording medium of the present invention, in which an undercoat layer 14 of substantially no information recording ability, a recording layer 12 and a protective layer 15 are formed on the substrate 11 in that order, and on the back of the substrate 11 on which the undercoat layer 14 are formed, formed is a back layer 16.

In this case, at least one of the undercoat layer 14, the abrasion-resistant protective layer 15 and the back layer 16 may be omitted.

Though depending on the use of the recording medium, the thickness of the substrate 11 is preferably from 1 $\mu$m to 10 mm. The thickness of the recording layer 12 is preferably from 1 nm to 100 $\mu$m. The thickness of the abrasion-resistant protective layer 15, the undercoat layer 14 and the back layer 16 is preferably from 1 nm to 100 $\mu$m, from 1 nm to 100 $\mu$m, and from 1 nm to 100 $\mu$m, respectively.

In the recording media of FIG. 1A to FIG. 1C, the recording layer 12 on which information data are to be written has inorganic grains included in the spherical grains 13 while two-dimensionally or three-dimensionally spaced from each other.

As a result, the inorganic grains do not aggregate in the recording layer but are isolated from each other, and the distance between the neighboring grains is specifically controlled.

The spherical grains shall have a substantially uniform grain size. As they have a substantially uniform grain size, the distance between the neighboring inorganic grains in the recording layer can be specifically controlled.

The terminology "substantially uniform grain size" is meant to indicate that the grain size of every spherical grain falls within the range of "the volume-average grain size +/−10%" of all the grains, preferably that all the grains are of molecules having a uniform chemical structural formula.

The mean grain size referred to herein is in terms of a volume-average grain size of the grains.

The inorganic grains to be included in the spherical grains may be any of a metal, an intermetallic compound, an alloy, a metal chalcogenide or a magnetic material, and are not specifically defined so far as they may be in the recording layer of ordinary recording media and have the ability to record information data on the recording layer.

Some examples of the inorganic grains to be in the recording medium are mentioned. For a magnetic recording medium, a magnetic substance may form the inorganic grains; for a phase-change optical recording medium, a phase-change material may form them; and for a charge-recording medium, a charge-recording material or a semiconductor material for image recording and reproduction through optical change may form them.

Concretely, the metal is any of Co, Fe and Ni; the intermetallic compound comprises any of Co, Fe, Ni, Cr, Mn, Sm, Nd, Pd, Pt and B; the alloy is a binary alloy or a ternary alloy of any of Co, Fe, Ni, Cr, Mn, Sm, Nd, Pd, Pt and B; and the metal chalcogenide is a material selected from a group consisting of an Fe oxide that additionally contains any one of the metal mentioned above except Fe, and barium ferrite and strontium ferrite.

For the metal, also usable is any of Au, Pd and Pt; and for the alloy, for example, usable is any of Sb—Se, Sb—Te, Ga—Se, Te—Se, Te—Se—Sb, Te—Ga—Se, Te—Ge—Sn, Te—As—Ge, and Ge—Sb—Te.

The size (volume-average grain size) of the inorganic grains is preferably as small as possible, since smaller inorganic grains ensure higher recording density. Concretely, it is desirable that the size falls between 0.5 and 10 nm. In particular, in the recording medium of the present invention, the grains are isolated from each other to reduce noises. Therefore, in this, the size of the grains is preferably made as small as possible for increasing the recording density.

Specific examples of the substance to be in the spherical grains to envelop the inorganic grains therein in the present invention (the substance will be hereinafter referred to as a spherical molecule) are dendrimers which are so designed as to have a structure capable of coordinating with a metal inside them.

Many materials of dendrimers are described in, for example, C. J. Hawker, et al.; *J. Chem. Soc., Commun.*, 1990, p. 1010; D. A. Tomalia, et al., *Angew. Chem. Int. Ed. Eng.*, Vol. 29, p. 138 (1990); C. J. Hawker, et al., *J. Am. Chem. Soc.*, Vol. 112, p. 7638 (1990); J. M. J. Frenchet, *Science*, Vol. 263, p. 1710 (1994); and G. R. Newkome, C. N. Moorefield, F. Vogtle, *Dendrimers and Dendrons* (2001, Wiley VCH). For the present invention, preferred are dendrimers which are so designed as to be able to highly coordinate with metal inside them and which can form nano-size grains based on the coordinated metal ions.

Some examples of dendrimers which have a structure capable of coordinating with a metal inside them and which are preferred for use in the present invention are mentioned below.

Dendrimer (1):

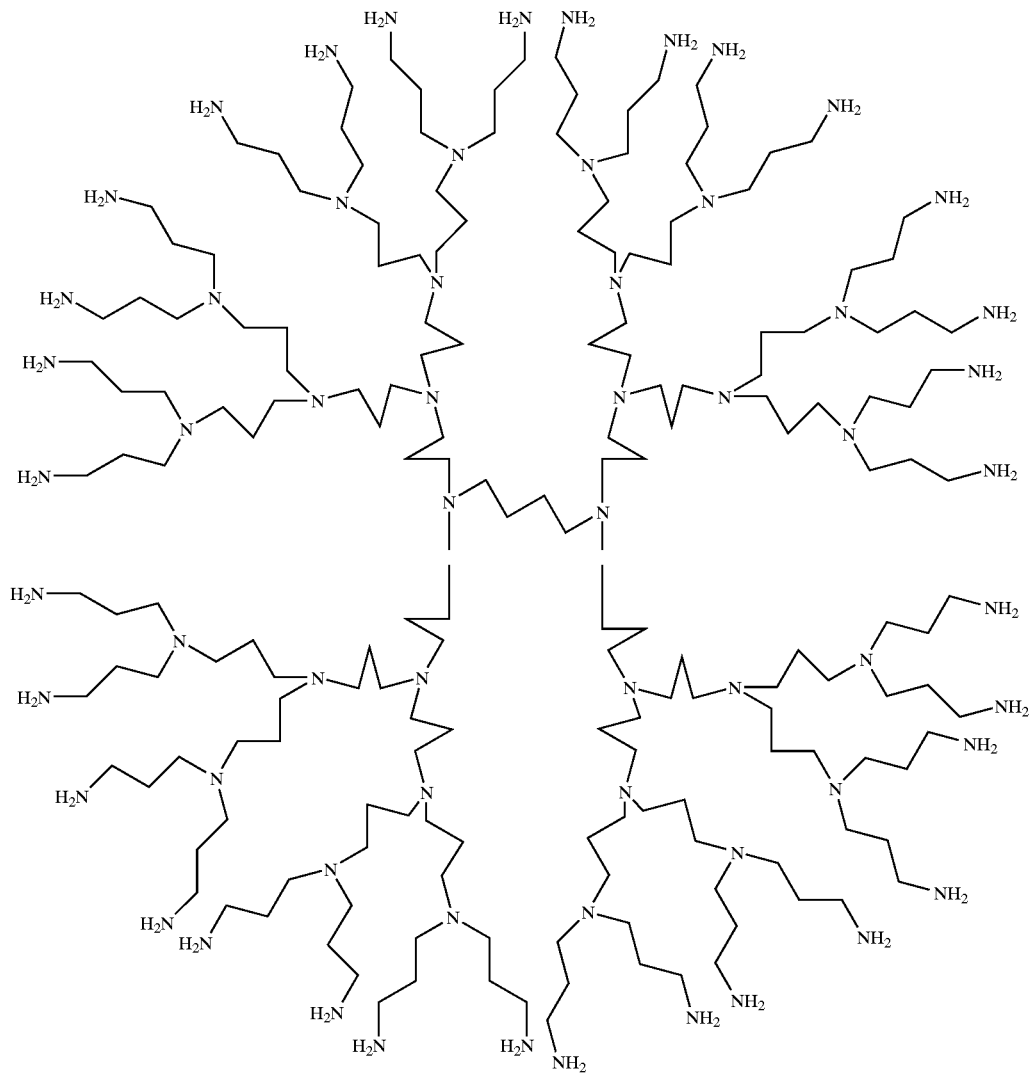

Dendrimer (2):
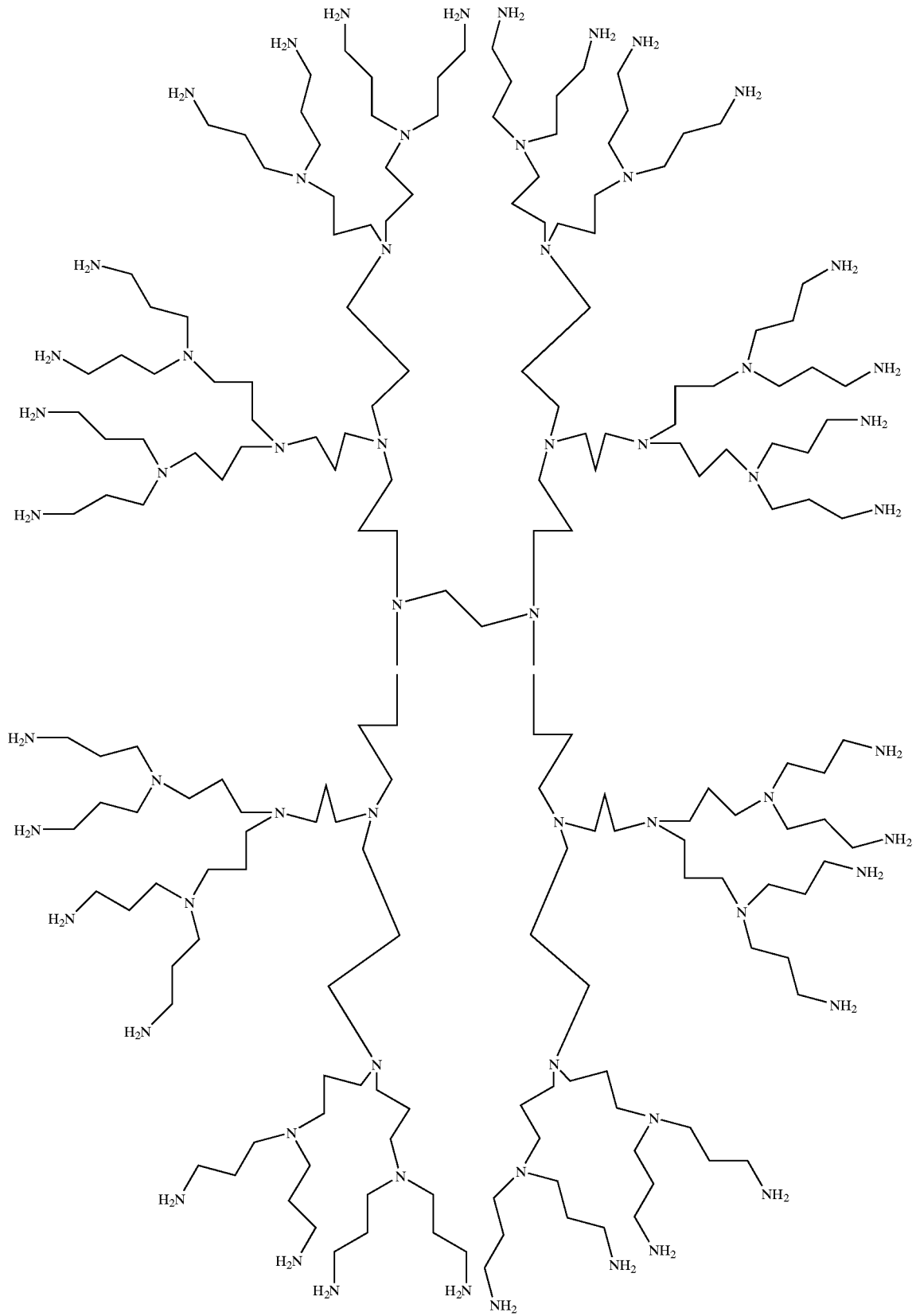

Dendrimer (3):
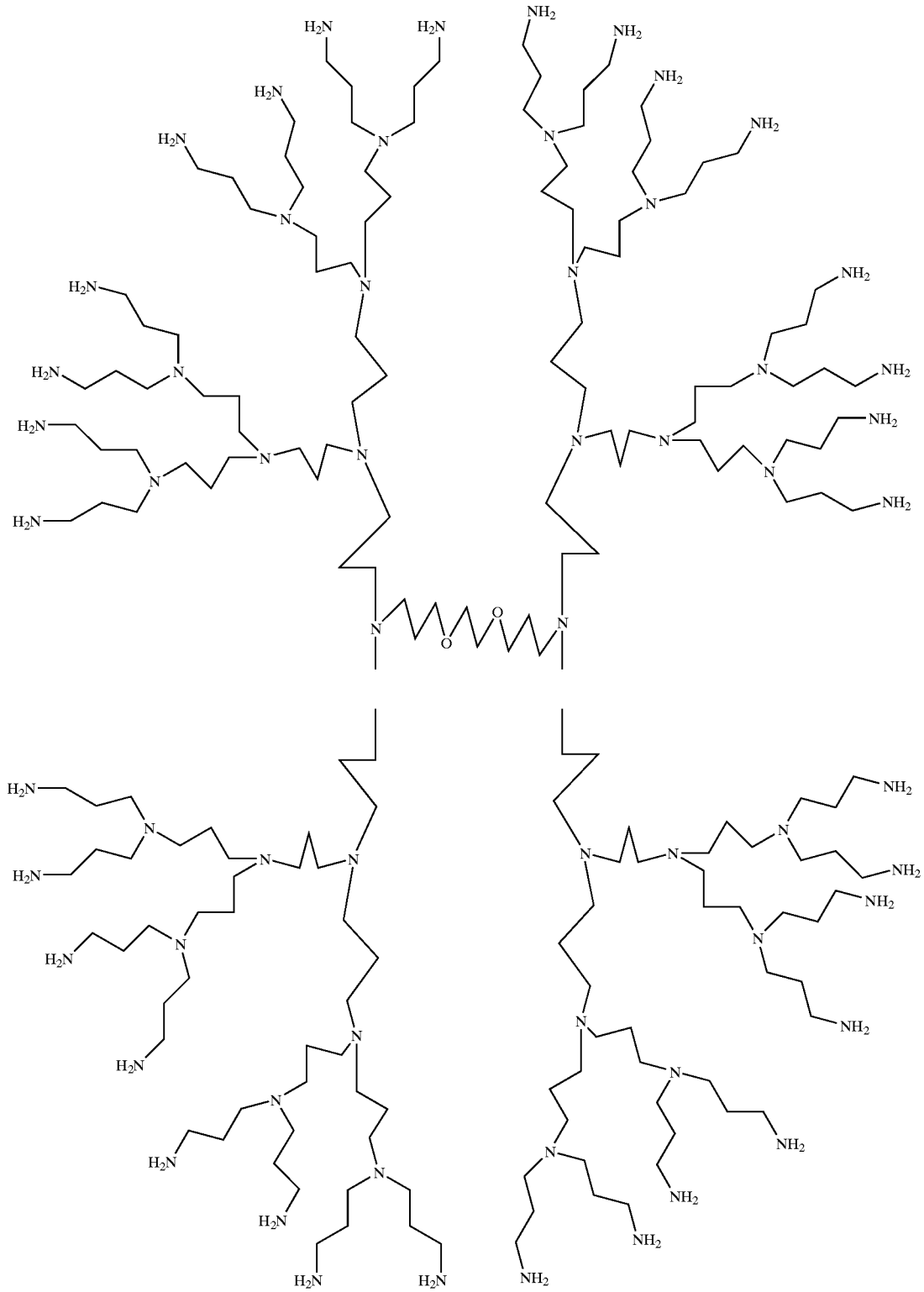

Dendrimer (4):
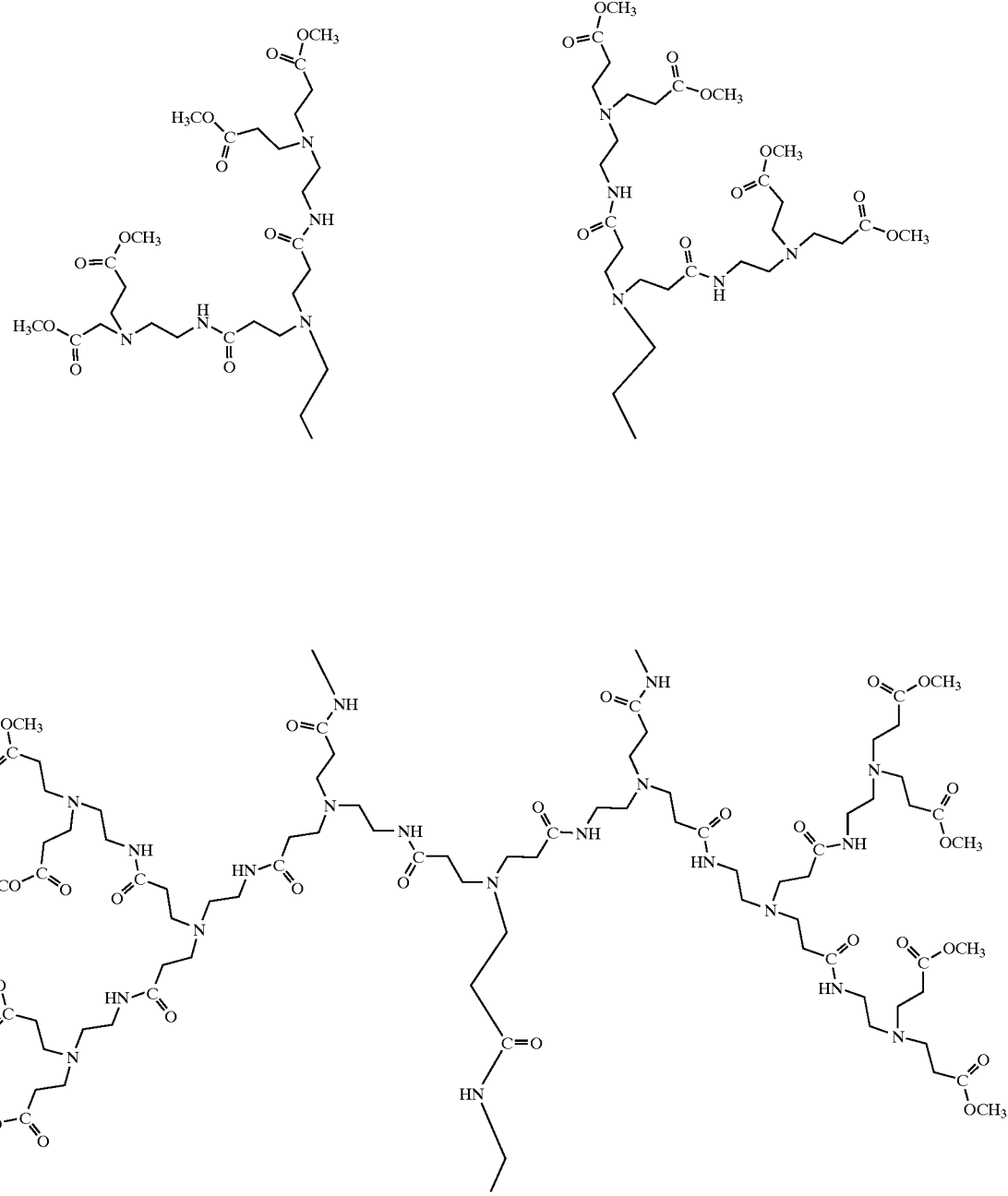

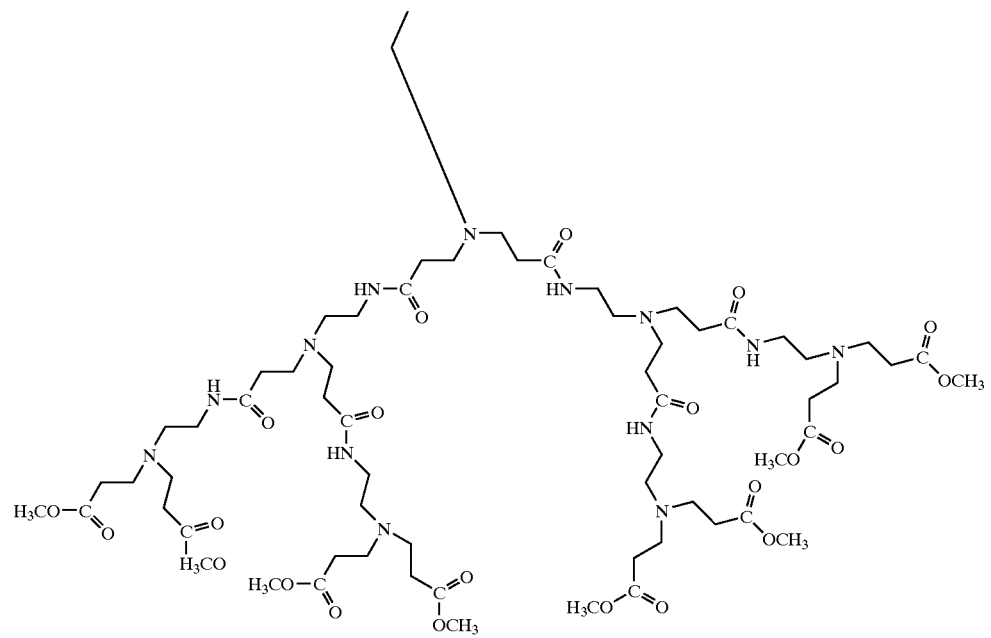
Dendrimer (5):
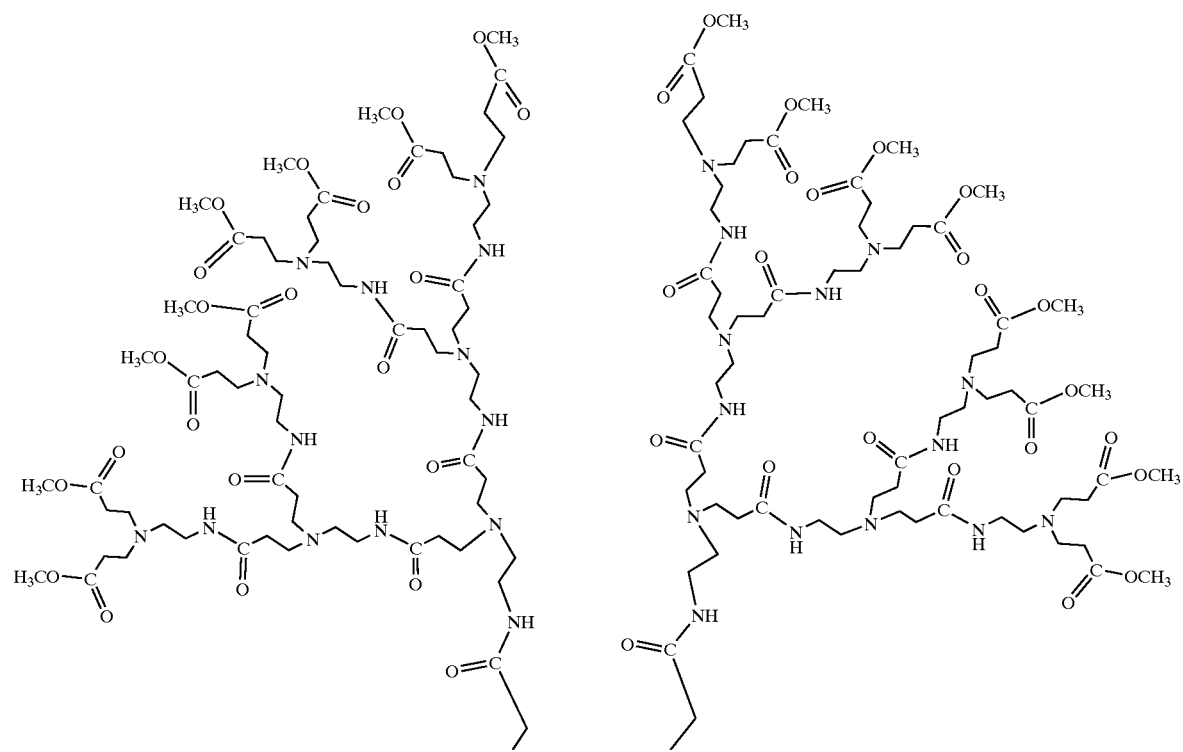

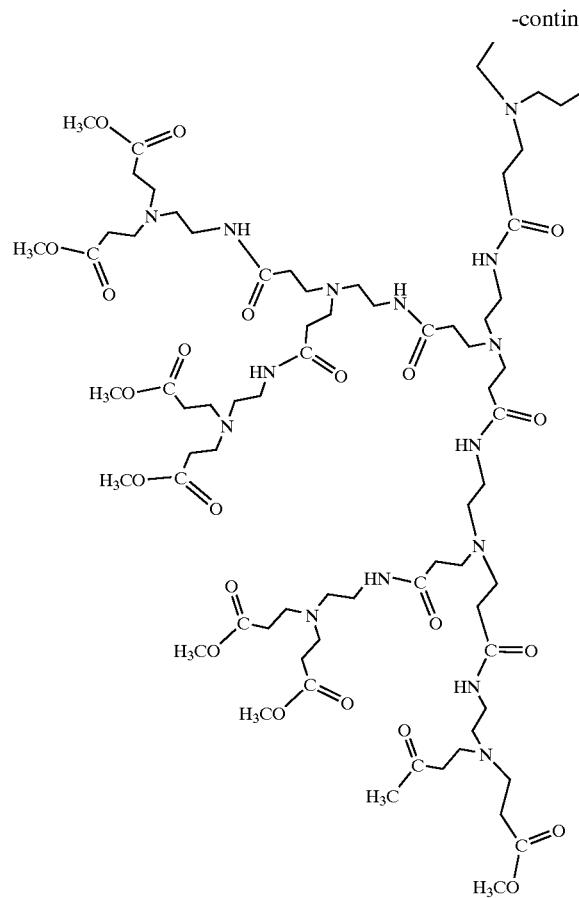
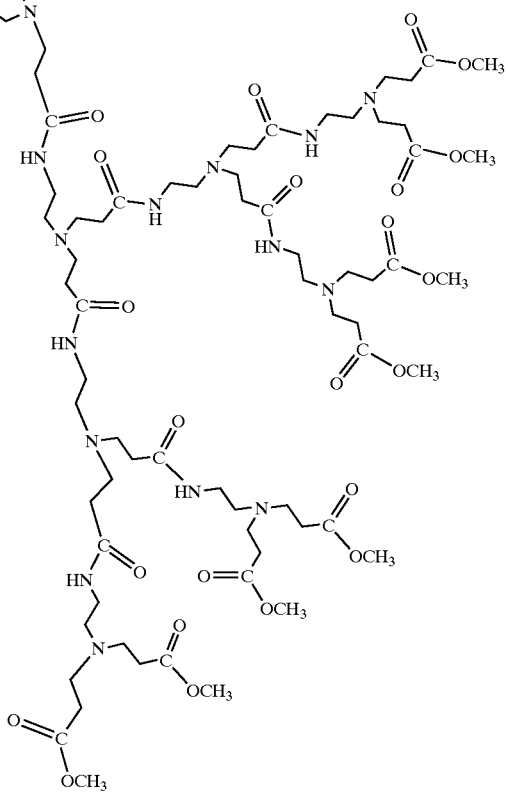
Dendrimer (6):
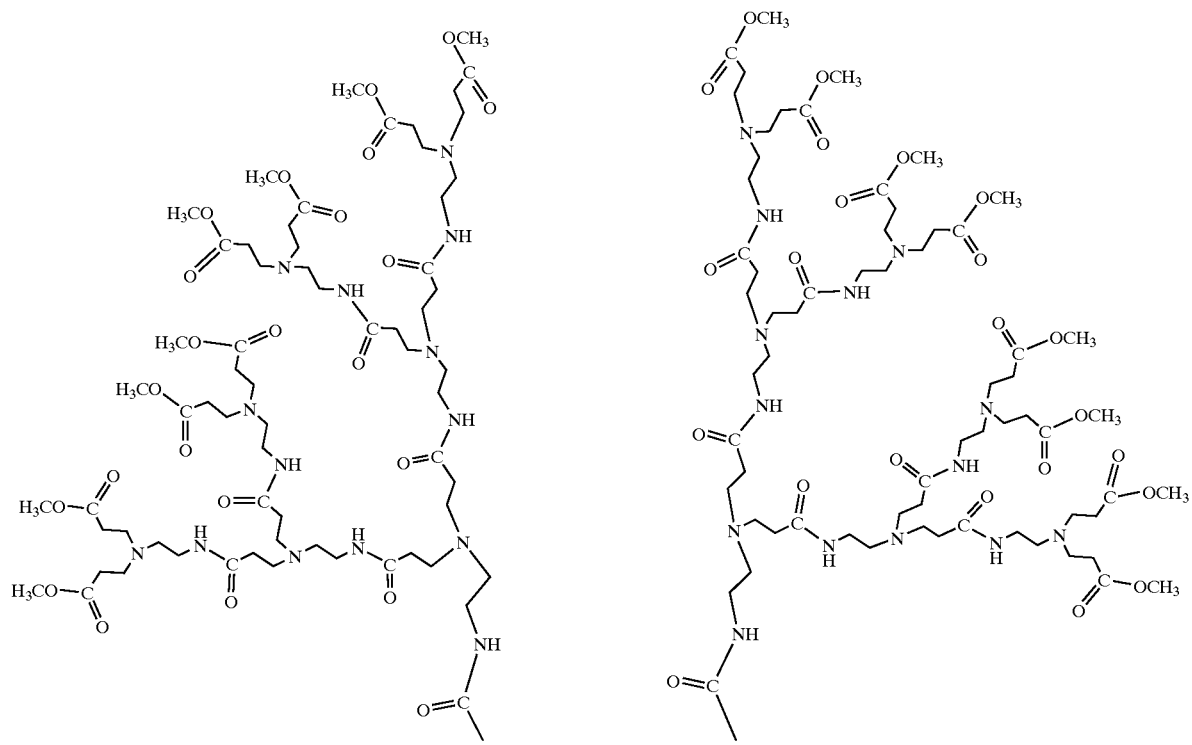

-continued
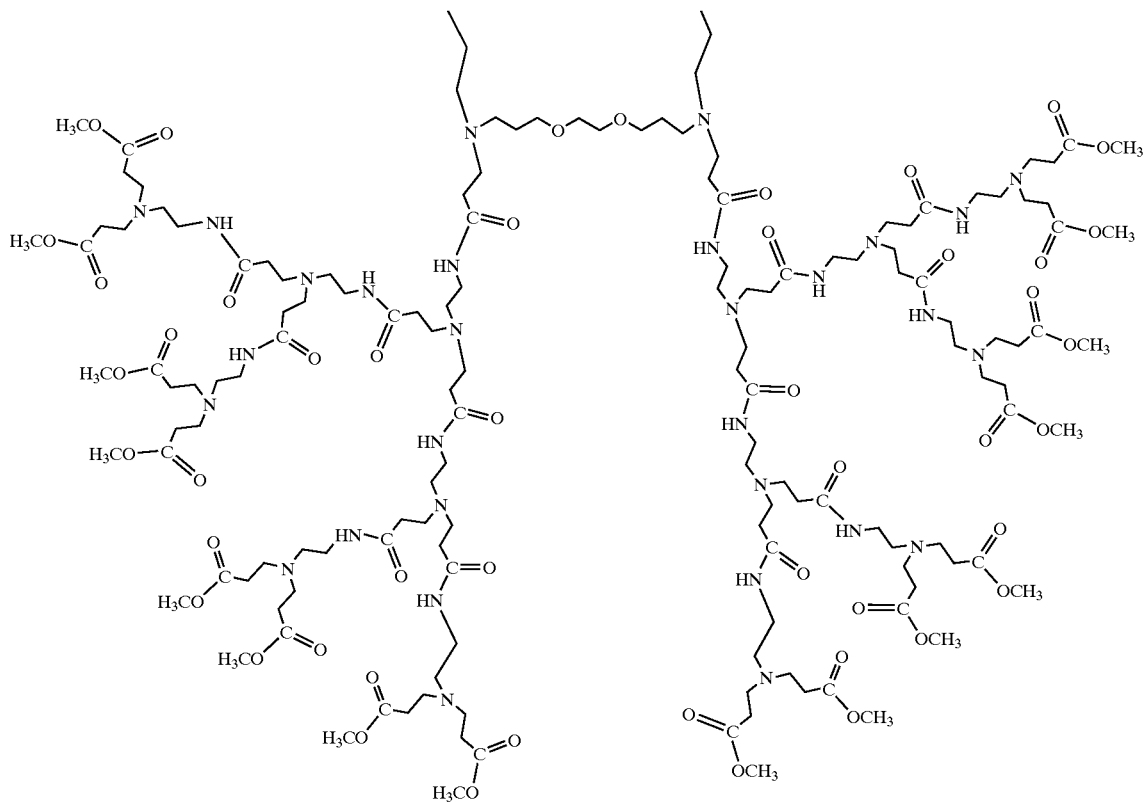
Dendrimer (7):
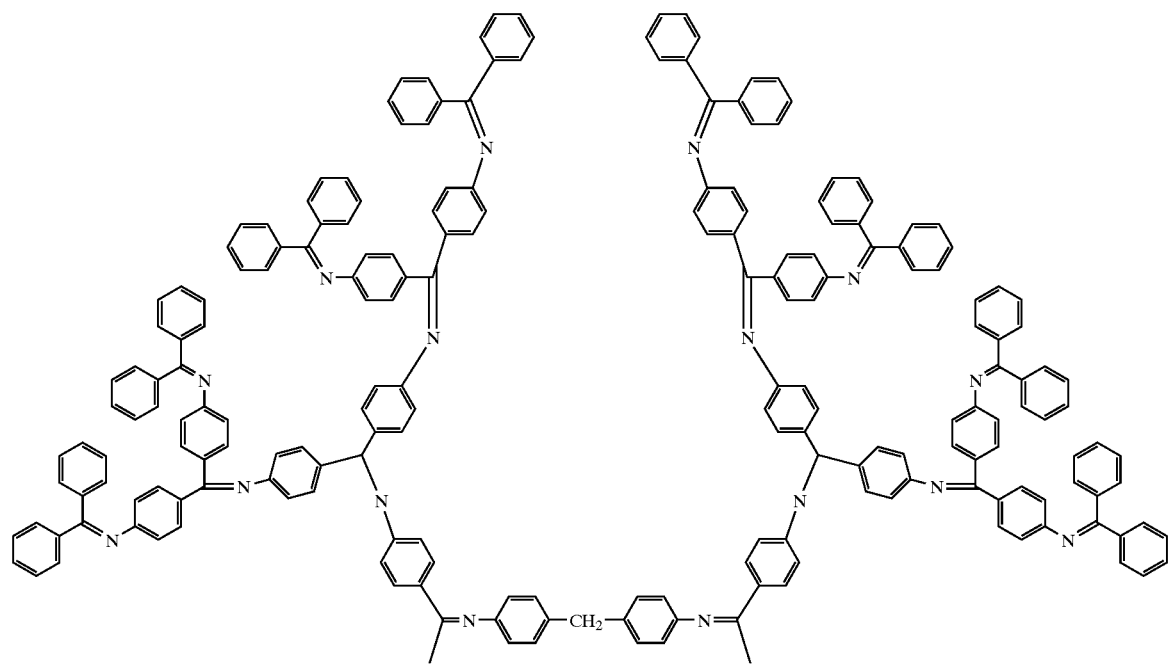

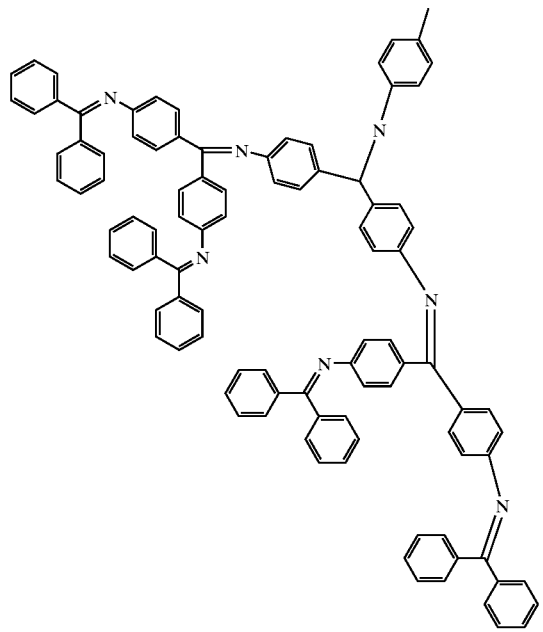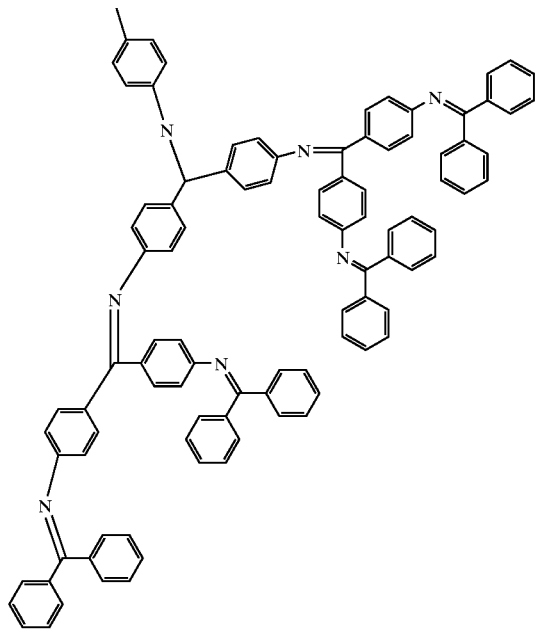
Dendrimer (8):
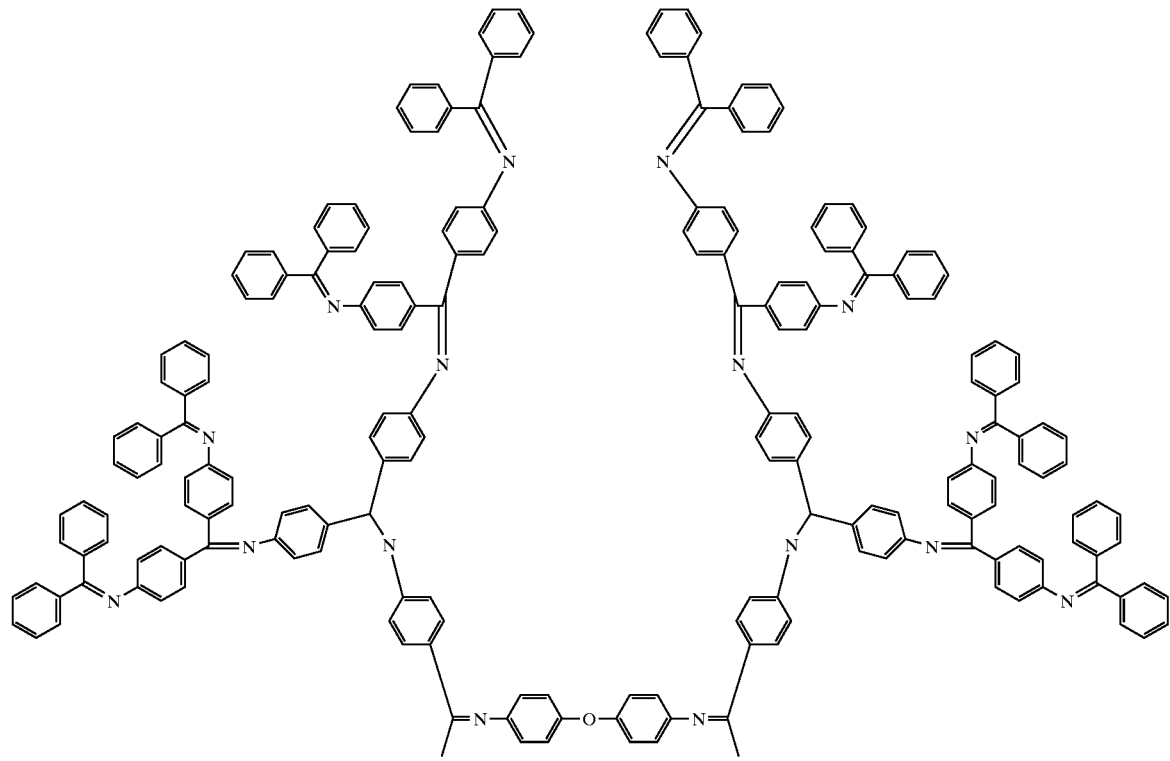

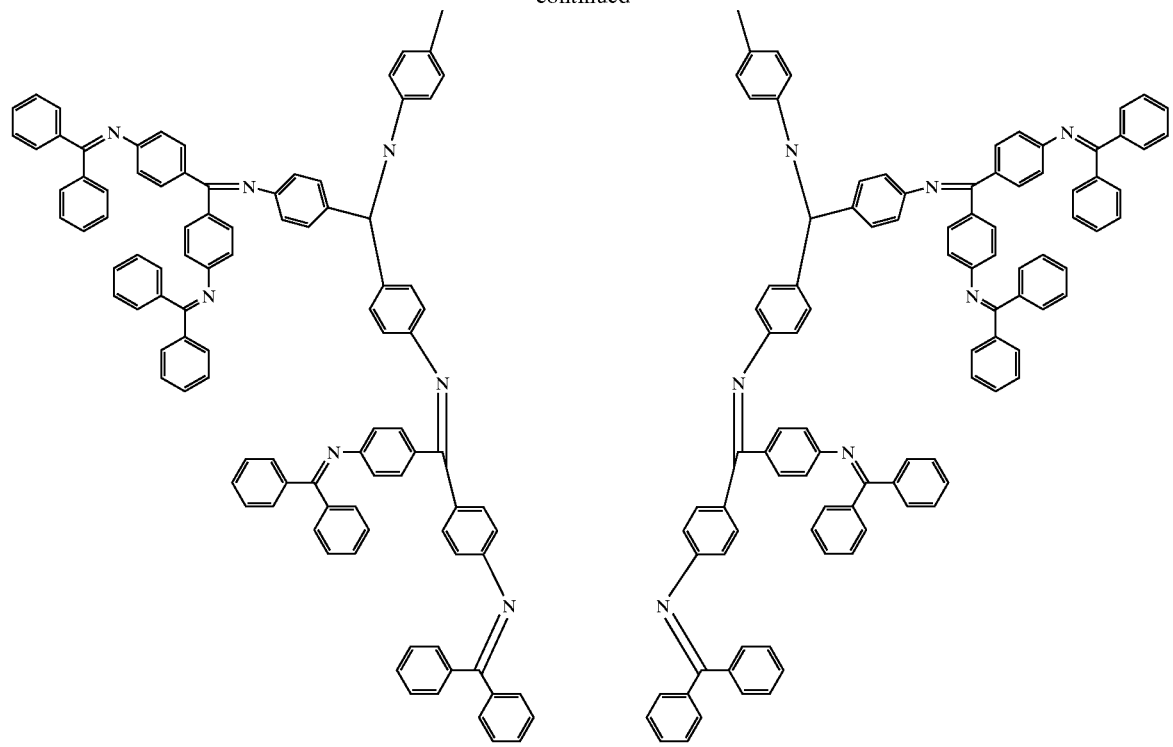
Dendrimer (9):
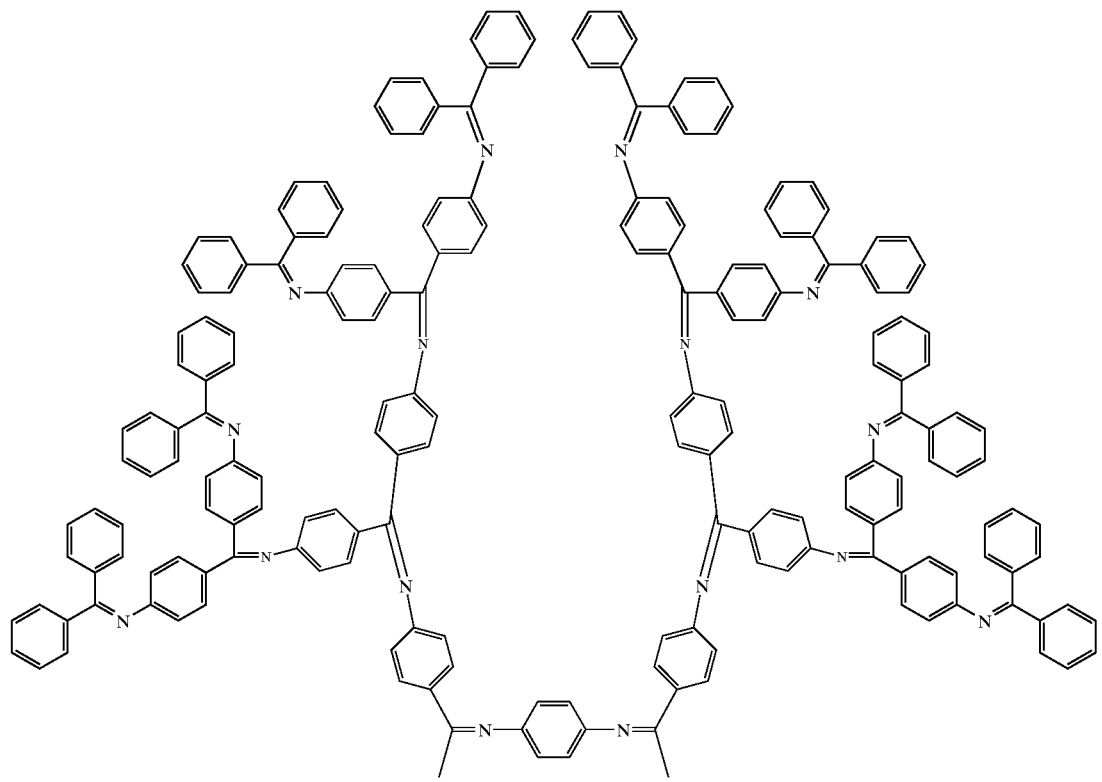

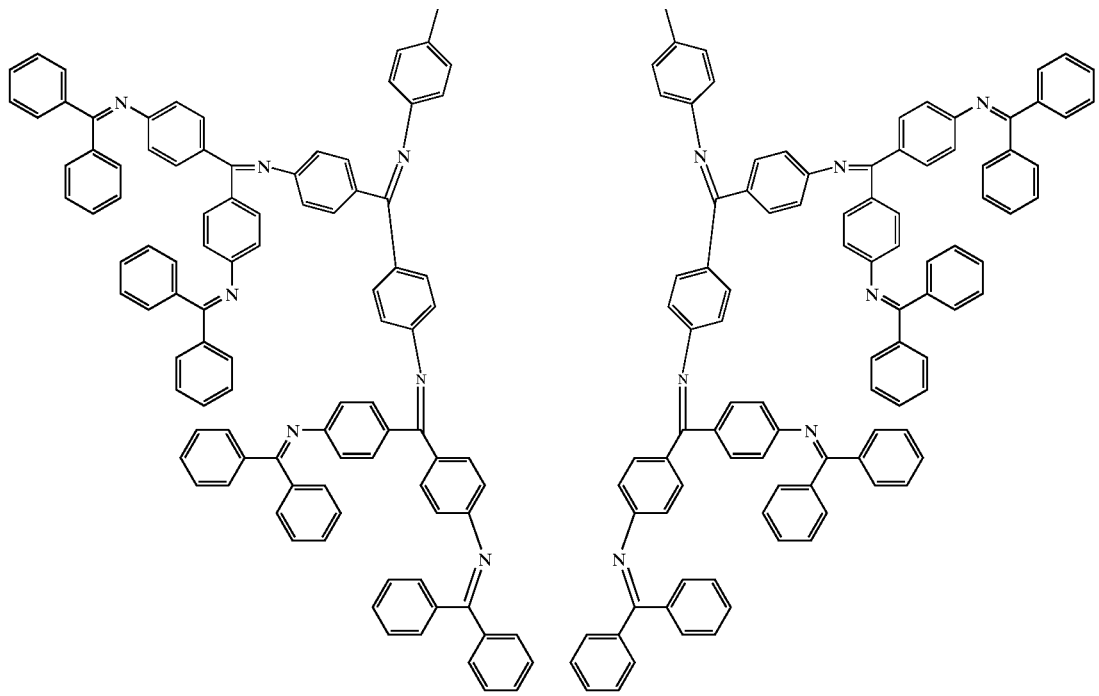
Dendrimer (10):
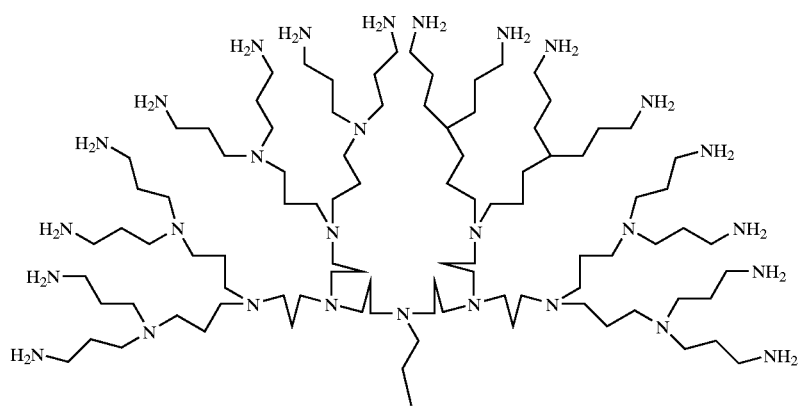

-continued

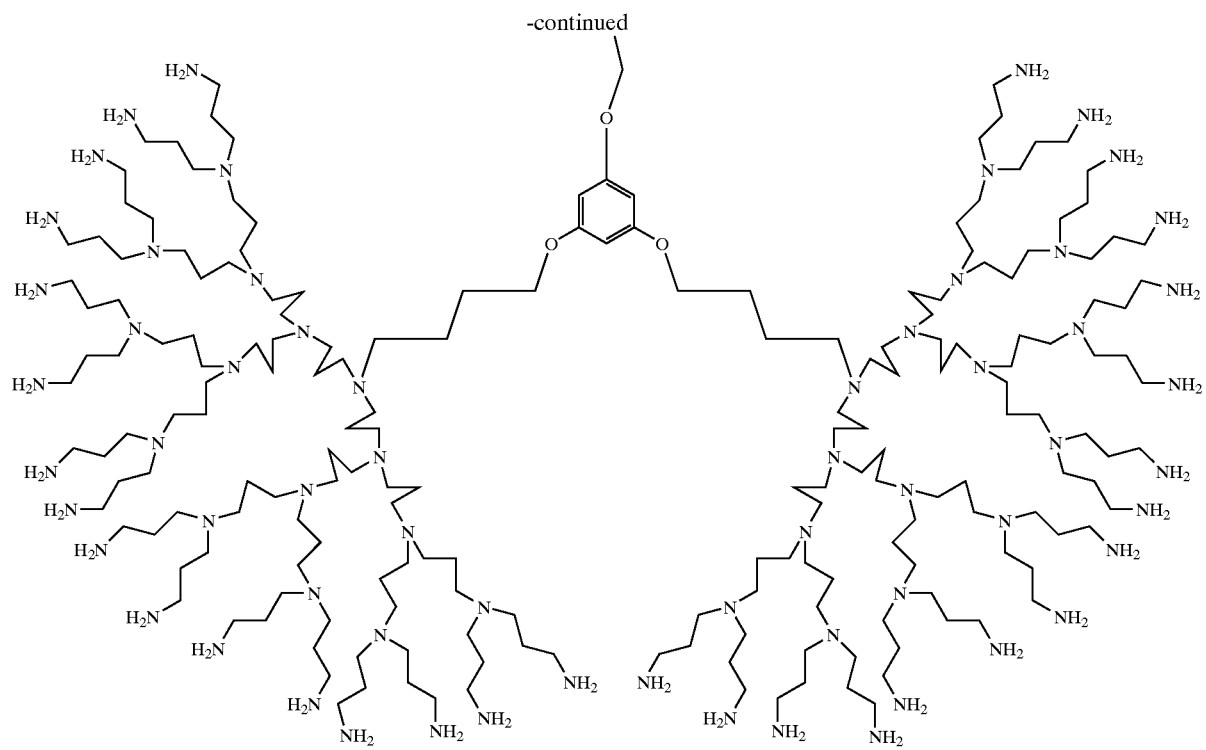

Of the dendrimers capable of coordinating with a metal inside them, those with trimethyleneimine therein (dendrimers (1), (2) and (3)) may be produced in a process of starting from ammonia and a compound having at least two primary amino groups, reacting them with acrylonitrile for cyanoethylation, then reducing the nitrile group in the resulting intermediate with hydrogen or ammonia in the presence of a catalyst into a primary amino group (step G1), and repeating three times the step G1 of cyanoethylation with reduction into a primary amino group (steps G2→G3→G4), for example, as in WO-A 9314147 and WO-A 9502008.

In place of ammonia, a compound having one and the same or at least two different functional groups selected from a primary amino group, an alcohol residue, a phenol residue, a thio residue, a thiophenol residue or a secondary amino group may be selected for the starting compound in the process.

Dendrimers with amidamine therein (dendrimers (4), (5) and (6)) may be produced in a process of starting from a compound having a primary amino group, reacting it with 2 equivalents of methyl acrylate at its amino group (Michel addition reaction) to give a nitrogen branch-having bifunctional methyl ester compound, then further reacting the methyl ester with a primary amino group-having diamine compound at its one primary amino group (ester/amide transaction) with the other primary amine group being left as it is (step G1), and repeating three times the step G1 of reaction with 2 equivalents of methyl acrylate followed by reaction of the methyl ester with a primary amino group-having diamine compound at its one primary amino group with the other primary amine group being left as it is (steps G2→G3→G4), for example, as in JP-B Nos. 7-2840, 7-57735 and 7-57736, and JP-A Nos. 7-267879 and 11-140180.

In place of ammonia, a compound having one and the same or at least two different functional groups selected from a primary amino group, an alcohol residue, a phenol residue, a thio residue, a thiophenol residue or a secondary amino group may be selected for the starting compound in the process.

Pi (π)-conjugated polyarylazomethine-containing dendrimers (dendrimer (7) and dendrimer (8)) may be produced in a process of reacting 4,4'-diaminobenzophenone and 2 equivalents of benzophenone, a type of ketone, at the amino group of the former to prepare a reaction product (step G2), then further reacting 4,4'-diaminobenzophenone with 2 times of the ketone prepared in the step G2 at the amino group of the former (step G3), still further reacting 4,4'-diaminobenzophenone with 2 times of the ketone prepared in the step G3 at the amino group of the former (step G4), and finally reacting a compound having two amino groups with 2 times of the reaction product prepared in the step G4, for example, as in K. Yamamoto, et al., J. Am. chem. Soc., Vol. 123, p. 4414 (2001).

Nano-size metal clusters with a dendrimer having the ability to coordinate with meta inside it are described, for example, in JP-A 2001-508484; D. A. Tomalia, et al., J. Am. Chem. Soc., Vol. 120, p. 7355 (1998); and R. M. Cooks, et al., Acc. Chem. Res., Vol. 34, p. 181 (2001). Also in the present invention, substantially monodispersed spherical molecules that include the intended inorganic grains are produced.

In the present invention, it is desirable that nano-size clusters of a metal, intermetallic compound, alloy or metal chalcogenide are produced, using a dendrimer that has the ability to coordinate with metal inside it, and then the clusters are annealed by heating them. Thus annealed, the grains in the clusters are stabilized. In case where the grains is made of a magnetic material, they are annealed so as to make them ferromagnetic. For annealing the clusters, the solvent is first removed from the dendrimer, and then the clusters are heated. Preferably, the clusters are heated in an oxygen-free atmosphere of, for example, argon or nitrogen or in vacuum. The heating temperature depends on the phase transition point of the metal, intermetallic compound, alloy or metal chalcogenide used or on the size of the clusters to be heated. For heating the clusters, employable is any and every energy application method. For example, the clusters may be heated in an electric furnace, or may be exposed to laser light. Annealing the clusters may be effected any time before or after the dendrimer for the clusters is applied onto the substrate.

The substantially monodispersed spherical particles that include a metal, an intermetallic compound, an alloy or a metal chalcogenide inside them may contain a functional group capable of forming a covalent bond to any other spherical molecules or to an organic or inorganic material except spherical molecules. Forming the covalent bond via such a functional group is preferred as enhancing the adhesiveness of the recording layer to the substrate.

In the present invention a material of substantially no information recording ability may be added to the recording layer or to the lower layer or the protective layer. Though its constitution is not specifically defined, the material comprises at least resin, and preferably, an inorganic or organic powder is dispersed in a resin to construct the material.

For the resin, usable is any of thermoplastic resin, thermosetting resin, reactive resin and their mixtures. The thermoplastic resin may have a glass transition point of from −100 to 150° C., a number-average molecular weight of from 1,000 to 200,000, preferably from 10,000 to 100,000, and a degree of polymerization of about from 50 to 1000 or so. Examples of the resin of the type are polymers or copolymers that comprise, as the constitutive units, any of vinyl chloride, vinyl acetate, vinyl alcohol, maleic acid, acrylic acid, acrylates, vinylidene chloride, acrylonitrile, methacrylic acid, methacrylates, styrene, butadiene, ethylene, vinyl butyral, vinyl acetal, and vinyl ether, as well as other various polyurethane resins and rubber resins.

The thermosetting resin and the reacting resin for use herein include, for example, phenolic resins, epoxy resins, curable polyurethane resins, urea resins, melamine resins, alkyd resins, acrylic reactive resins, formaldehyde resins, silicone resins, epoxy-polyamide resins, polyester resin/isocyanate prepolymer mixtures, polyester-polyol/polyisocyanate mixtures, and polyurethane/polyisocyanate mixtures. These resins are described in detail, for example, in *Plastic Handbook* (published by Asakura Shoten).

Any known electronic radiation-curable resin may be in the layers that constitute the recording medium of the present invention. Its examples and methods for producing them are described in detail, for example, in JP-A No. 62-256219. The resins mentioned above may be used herein either singly or as combined.

Solvents that may be used in the present invention may be any known ones, including, for example, those described in JP-A No. 6-68453, as well as cyclohexanone and methyl ethyl ketone.

The organic powder for use herein may be selected from inorganic compounds of, for example, metal oxides, metal carbonates, metal nitrides, and metal carbides. Concretely, the inorganic compounds include, for example, α-alumina, β-alumina, γ-alumina, θ-alumina, silicon carbide, chromium oxide, cerium oxide, α-iron oxide, goethite, silicon nitride, titanium dioxide, silicon dioxide, tin oxide, magnesium oxide, zirconium oxide, zinc oxide, and barium sulfate. Either singly or as combined, they are sued in the present invention. Regarding their morphology, they may be in any form of needles or spherical, polyhedral or tabular grains. If desired, carbon black may be added to them.

The organic powder for use herein includes, for example, acryl-styrene resin powder, benzoguanamine resin powder, melamine resin powder and phthalocyanine pigment. For it, in addition, also usable are polyolefin resin powder, polyester resin powder, polyamide resin powder, polyimide resin powder, and polyethylene fluoride resin.

Regarding their preparation, for example, referred to are JP-A Nos. 62-18564 and 60-255827. For the binder resin (its type and amount) to be in the undercoat layer, and also the amount and the type of the lubricant, the dispersant and other various additives also to be in the undercoat layer, as well as the solvent and the dispersion method for them, employable are any known techniques relating to magnetic layers in the art.

Regarding its material, the protective layer may be formed of, for example, an amorphous carbon film composed of carbon and hydrogen, that is, so-called diamond-like carbon (DLC); or any of silicon oxide, polar group-having silicones, fatty acid-modified silicones, fluorine-containing silicones, fluorine-containing alcohols, fluorine-containing ethers, polar group-having perfluoro-polyethers, polyolefins, polyglycols, alkylphosphates and their alkali metal salts, alkylsulfates and their alkali metal salts, polyphenyl ethers, phenylphosphonic acid, α-naphthylphosphoric acid, phenylphosphoric acid, diphenylphosphoric acid, p-ethylbenzenephosphonic acid, phenylphosphinic acid, aminoquinones, various silane coupling agents, titanium coupling agents, fluorine-containing alkylsulfate esters and their alkali metal salts, monobasic fatty acids having from 10 to 24 carbon atoms (they may be unsaturated or branched) and their metal salts (e.g., with Li, Na, K or Cu), mono, di, tri, tetra, penta and hexa-alcohols having from 12 to 22 carbon atoms (they may be unsaturated or may be branched), alkoxyalcohols having from 12 to 22 carbon atoms (they may be unsaturated or may be branched), mono, di or tri-fatty acid esters of monobasic fatty acids having from 10 to 24 carbon atoms (they may be unsaturated or may be branched) with any one of mono, di, tri, tetra, penta or hexa-alcohols having from 2 to 12 carbon atoms (they may be unsaturated or may be branched), monoalkyl ether fatty acid esters of alkylene oxide polymers, fatty acid amides having from 8 to 22 carbon atoms, and aliphatic amines having from 8 to 22 carbon atoms.

The protective layer may be formed in various known methods. For example, it may be formed according to the method described in JP-A No. 2001-189007.

For the undercoat layer, usable is any and every material of no information recording ability. Some preferred examples for it are metal films of, for example, aluminium formed through vapor deposition or plating, as well as films of resin, inorganic powder or organic powder.

For the substrate, usable are any known films of, for example, polyesters such as polyethylene terephthalate or polyethylene naphthalate, as well as polyolefins, cellulose triacetate, polycarbonates, polyamides (e.g., aromatic polyamides such as aramide), polyimides, polyamidimides, polysulfones or polybenzoxazoles. Of those, preferred for use herein are high-strength substrates of polyethylene naphthalate or aramide.

These substrates may be pre-treated through corona discharging, plasma treatment, treatment for adhesiveness improvement, thermal treatment, or dust-removing treatment. As the case may be, aluminium or glass may also be used for the substrate.

Preferably, the substrate has a polar group of, for example, —OH, —COOH, —NH$_2$, —CONH$_2$, —SO$_3$H, or —PO$_3$H formed on its surface. The polar group may be derived from the material of the substrate itself, or may be formed by chemically or physically bonding or adsorbing a different compound to the substrate.

For forming the recording layer, for example, employed is a method of forming the above-mentioned undercoat layer and the intended recording layer in that order on the substrate, in which the recording layer shall contain spherical molecules that have a substantially a uniform grain size and include any of a metal, an intermetallic compound, an alloy or a metal chalcogenide. For this, for example, the layer-forming substance may be deposited on the substrate through vapor deposition or may be adsorbed thereto by dipping the substrate in a solution of the layer-forming substance; or a dispersion of the layer-forming substance may be applied to the substrate in a mode of gravure coating, roll coating, blade coating, extrusion coating, spraying or spin coating.

If desired, the undercoat layer and the recording layer may be formed at the same time. For forming the two layers at the same time, for example, employable are three methods. The first method comprises forming the undercoat layer in a mode of gravure coating, roll coating, blade coating or extrusion coating, and while the thus-formed undercoat layer is not as yet dried, forming the upper recording layer in a mode of substrate-pressure extrusion coating, for example, as in JP-B No. 1-46186, JP-A Nos. 60-238179 or 2-265672; the second method comprises forming the upper and lower layers, undercoat layer and recording layer, almost simultaneously through one coating head that has two coating liquid slits, for example, as in JP-A Nos. 63-88080, 2-17971 and 2-265672; and the third method comprises forming the upper and lower layers also almost simultaneously by the use of a backup roll-equipped extrusion coater, for example, as in JP-A No. 2-174965.

EXAMPLES

The present invention is described more concretely with reference to the following Examples, which, however, are not intended to restrict the scope of the present invention.

Production Examples

The following Production Examples are to concretely demonstrate the formation of spherical grains that include inorganic grains and have a substantially uniform grain size.

Production Example 1

Production of Dendrimer (1)

<1> Production of 1,4-diaminobutane-N,N'-tetra-1-propionitrile:DA(ACN)$_4$ 88 g (1 mol) of 1,4-diaminobutane (DAB) and 1200 ml of water were put into a 2-liter three-neck flask equipped with a stirrer, a condenser tube and a dropping funnel, and 424 g (8 mols) of acrylonitrile was dropwise added thereto with stirring. After the addition, this was heated under reflux at 80° C. for 1 hour with further stirring.

Next, water and the excess acrylonitrile were evaporated away under reduced pressure, and 290 g of DAB(ACN)$_4$ was thus obtained. Its structure was confirmed through $^{13}$C-NMR.

<2> Production of Dendrimer (1) G1:1,4-diaminobutane-N,N'-tetra-1-propylamine:DAB(PA)$_4$ 24 g (0.08 mols) of DAB(ACN)$_4$ and 200 ml of methanol were put into a 1-liter autoclave, to which was added 5.6 g of a Raney-cobalt catalyst (Co, 78 to 96% by weight; Cr, 0.5 to 5% by weight; Ni, 0.5 to 5% by weight; Al, 3 to 12% by weight) that had been washed with 25 ml of ethanol. With these therein, the autoclave was closed. Then, the autoclave was purged twice with hydrogen, and hydrogen was introduced thereinto up to 50 atmospheres. With stirring, this was heated up to 60° C. Then, this was kept heated at 60° C. for 20 minutes with still stirring, and then left cooled to room temperature, and hydrogen was degassed. Then, the autoclave was purged with nitrogen, and the reaction mixture therein was taken out. The Raney-cobalt catalyst was removed through filtration, and methanol was evaporated away from the mixture under reduced pressure. The process gave 24 g of 1,4-diaminobutane-N,N'-tetra-1-propylamine:DAB(PA)$_4$. Its structure was confirmed through $^{13}$C-NMR.

<3> Production of DAB(PA)$_4$(ACN)$_8$ 63 g (0.2 mols) of DAB(PA)$_4$ and 265 g (5 mols) of acrylonitrile were put into a 2-liter three-neck flask equipped with a stirrer and a condenser tube, and heated under reflux at 80° C. for 3 hours with stirring.

Next, the excess acrylonitrile was evaporated away under reduced pressure, and 140 g of DAB(PA)$_4$(ACN)$_8$ was thus obtained. Its structure was confirmed through $^{13}$C-NMR.

<4> Production of Dendrimer (1) G2:DAB(PA)$_4$(PA)$_8$ 59 g (0.08 mols) of DAB(PA)$_4$(ACN)$_8$ and 300 ml of methanol were put into a 2-liter autoclave, to which was added 2.5 g of Raney-cobalt catalyst that had been washed with 25 ml of ethanol, and then the autoclave was closed. Then, the autoclave was purged twice with hydrogen, and hydrogen was introduced thereinto up to 50 atmospheres. With stirring, this was heated up to 50° C. Then, this was kept heated at 50° C. for 200 minutes with still stirring, and then left cooled to room temperature, and hydrogen was degassed. Then, the autoclave was purged with nitrogen, and the reaction mixture therein was taken out. The Raney-cobalt catalyst was removed through filtration, and methanol was evaporated away from the mixture under reduced pressure. The process gave 59 g of DAB(PA)$_4$(PA)$_8$. Its structure was confirmed through $^{13}$C-NMR.

<5> Production of DAB(PA)$_4$(PA)$_8$(ACN)$_{16}$ 39 g (0.05 mols) of DAB(PA)$_4$(PA)$_8$ and 212 g (4 mols) of acrylonitrile were put into a 2-liter three-neck flask equipped with a stirrer and a condenser tube, and heated under reflux at 80° C. for 4 hours with stirring. Next, the excess acrylonitrile was evaporated away under reduced pressure, and DAB(PA)$_4$(PA)$_8$(ACN)$_{16}$ was thus obtained. Its structure was confirmed through $^{13}$C-NMR.

<6> Production of Dendrimer (1) G3:DAB(PA)$_4$(PA)$_8$(PA)$_{16}$ 65 g (0.04 mols) of DAB(PA)$_4$(PA)$_8$(ACN)$_{16}$ and 300 ml of methanol were put into a 2-liter autoclave, to which was added 6.0 g of Raney-cobalt that had been washed with 25 ml of ethanol, and then the autoclave was closed. Then, the autoclave was purged twice with hydrogen, and hydrogen was introduced thereinto up to 50 atmospheres. With stirring, this was heated up to 80° C. Then, this was kept heated at 80° C. for 240 minutes with still stirring, and then left cooled to room temperature, and hydrogen was degassed. Then, the autoclave was purged with nitrogen, and the reaction mixture therein was taken out. The Raney-cobalt catalyst was removed through filtration, and methanol was evaporated away from the mixture under reduced pressure. The process gave 64 g of DAB(PA)$_4$(PA)8(PA)$_{16}$. Its structure was confirmed through $^{13}$C-NMR.

<7> Production of DAB(PA)$_4$(PA)$_8$(PA)$_{16}$(ACN)$_{32}$ 50.5 g (0.03 mols) of DAB(PA)$_4$(PA)$_8$(PA)$_{16}$ and 212 g (4 mols) of acrylonitrile were put into a 2-liter three-neck flask equipped with a stirrer and a condenser tube, and heated under reflux at 80° C. for 5 hours with stirring. Next, the excess acrylonitrile was evaporated away under reduced pressure, and DAB(PA)$_4$(PA)8(PA)$_{16}$(ACN)$_{32}$ was thus obtained. Its structure was confirmed through $^{13}$C-NMR.

<8> Production of Dendrimer (1):DAB(PA)$_4$(PA)$_8$ (PA)$_{16}$(PA)$_{32}$ 67.6 g (0.02 mols) of DAB(PA)$_4$(PA)$_8$(PA)$_{16}$(ACN)$_{32}$ and 500 ml of methanol were put into a 2-liter autoclave, to which was added 8.0 g of Raney-cobalt catalyst that had been washed with 25 ml of ethanol, and then the autoclave was closed. Then, the autoclave was purged twice with hydrogen, and hydrogen was introduced thereinto up to 50 atmospheres. With stirring, this was heated up to 80° C. Then, this was kept heated at 80° C. for 360 minutes with still stirring, and then left cooled to room temperature, and hydrogen was degassed. Then, the autoclave was purged with nitrogen, and the reaction mixture therein was taken out. The Raney-cobalt catalyst was removed through filtration, and methanol was evaporated away from the mixture under reduced pressure. The process gave 65 g of polypropylamine-dendrimer (1):DAB(PA)$_4$(PA)$_8$(PA)$_{16}$(PA)$_{32}$. Its structure was confirmed through $^{13}$C-NMR.

Production Example 2

Production of Dendrimer (9)

<1> Production of bis[4-{(diphenylmethylene)amino}phenyl]methanone: Dendrimer (9)-dendrone G2

A solution of 8 g (0.04 mols) of titanium(IV) tetrachloride in 30 ml of chlorobenzene was prepared and put into a 50-ml dropping funnel. 6 g (0.028 mols) of 4,4'-diaminobenzophenone, 51.4 g (0.28 mols) of benzophenone, 19 g (0.17 mols) of DABCO (diazabicyclooctane) and 200 ml of chlorobenzene were put into a 1-liter four-neck flask equipped with a stirrer, the dropping funnel that contains the chlorobenzene solution of titanium(IV) tetrachloride, and a condenser tube, and the flask was set in an oil bath. With stirring, the chlorobenzene solution of titanium(IV) tetrachloride was dropwise added to the mixture in the flask at room temperature within 30 minutes, and then the oil bath was heated up to 125° C. Continuously stirring for further 18 hours, this was left cooled to room temperature. The insoluble solid was taken out through filtration, and chlorobenzene and the other volatile components were evaporated away under reduced pressure. The residue was purified through column chromatography with ethyl acetate/hexane therein, and 8 g of bis[4-{(diphenylmethylene)amino}phenyl]methanone:dendrimer (9)-dendrone G2 was obtained. Its structure was confirmed through $^{13}$C-NMR.

<2> Production of bis[4-[[bis[4-{(diphenylmethylene)amino}phenyl]methylene]amino]phenyl]methanone:Dendrimer (9)-dendrone G3

A solution of 1 g (5.3 mmols) of titanium(IV) tetrachloride in 10 ml of chlorobenzene was prepared and put into a 20-ml dropping funnel. 5.8 g (10.7 mmols) of dendrimer (9)-dendrone G2, 0.8 g (3.6 mmols) of 4,4'-diaminobenzophenone, 2.4 g (21.5 mmols) of DABCO and 100 ml of chlorobenzene were put into a 500-ml four-neck flask equipped with a stirrer, the dropping funnel that contains the chlorobenzene solution of titanium(IV) tetrachloride, and a condenser tube, and the flask was set in an oil bath. With stirring, the chlorobenzene solution of titanium(IV) tetrachloride was dropwise added to the mixture in the flask at room temperature within 30 minutes, and then the oil bath was heated up to 125° C. Continuously stirring for further 18 hours, this was left cooled to room temperature. The insoluble solid was taken out through filtration, and chlorobenzene and the other volatile components were evaporated away under reduced pressure. The residue was purified through column chromatography with ethyl acetate/hexane therein, and 2.9 g of bis[4-[[bis[4-{(diphenylmethylene)amino}phenyl]methylene]-amino]phenyl]methanone:dendrimer (9)-dendrone G3 was obtained. Its structure was confirmed through $^{13}$C-NMR.

<3> Production of bis[4-[[bis[4-[[bis[4-{(diphenylmethylene)amino}phenyl]-methylene]amino]phenyl]methylene]amino]phenyl]-methanone: Dendrimer (9)-dendrone G4

A solution of 1.4 g (7.6 mmols) of titanium(IV) tetrachloride in 10 ml of chlorobenzene was prepared and put into a 20-ml dropping funnel. 19.0 g (15.1 mmols) of dendrimer (9)-dendrone G3, 1.1 g (5.0 mmols) of 4,4'-diaminobenzophenone, 3.4 g (30.2 mmols) of DABCO and 200 ml of chlorobenzene were put into a 500-ml four-neck flask equipped with a stirrer, the dropping funnel that contains the chlorobenzene solution of titanium(IV) tetrachloride, and a condenser tube, and the flask was set in an oil bath. With stirring, the chlorobenzene solution of titanium(IV) tetrachloride was dropwise added to the mixture in the flask at room temperature within 30 minutes, and then the oil bath was heated up to 125° C. Continuously stirring for further 18 hours, this was left cooled to room temperature. The insoluble solid was taken out through filtration, and chlorobenzene and the other volatile components were evaporated away under reduced pressure. The residue was purified through column chromatography with ethyl acetate/hexane therein, and 6.7 g of bis[4-[[bis[4-[[bis[4-{(diphenylmethylene)amino}phenyl]-methylene]amino]phenyl]methylene]amino]phenyl]-methanone:dendrimer (9)-dendrone G4 was obtained. Its structure was confirmed through $^{13}$C-NMR.

<4> Production of Dendrimer (9)

A solution of 1.1 g (5.6 mmols) of titanium(IV) tetrachloride in 10 ml of chlorobenzene was prepared and put into a 20-ml dropping funnel. 20.0 g (7.5 mmols) of dendrimer (9)-dendrone G4, 0.4 g (3.7 mmols) of 4,4'-diaminobenzene, 2.5 g (22.2 mmols) of DABCO and 200 ml of chlorobenzene were put into a 500-ml four-neck flask equipped with a stirrer, the dropping funnel that contains the chlorobenzene solution of titanium(IV) tetrachloride, and a condenser tube, and the flask was set in an oil bath. With stirring, the chlorobenzene solution of titanium(IV) tetrachloride was dropwise added to the mixture in the flask at room temperature within 30 minutes, and then the oil bath was heated up to 125° C. Continuously stirring for further 18 hours, this was left cooled to room temperature. The insoluble solid was taken out through filtration, and chlorobenzene and the other volatile components were evaporated away under reduced pressure. The residue was purified through column chromatography with ethyl acetate/hexane therein, and 6.3 g of dendrimer (9) was obtained. Its structure was confirmed through $^{13}$C-NMR.

Production Example 3

Production of Dendrimer (10)

<1>Production of 1,3,5-tris[3'-cyanopropyloxy]benzene 37.8 g (0.3 mols) of 1,3,5-trihydroxybenzene and 500 ml of anhydrous ethanol were put into a 2-liter three-neck flask equipped with a condenser tube, and nitrogen was bubbled into it for 15 minutes. With the nitrogen atmosphere being kept as such, this was stirred at room temperature, and a solution of 16.2 g (0.3 mols) of sodium methoxide in 200 ml of anhydrous ethanol was added thereto.

With further stirring, 47.7 g (0.9 mols) of acrylonitrile was dropwise added to it at 15° C. to 45° C. After the addition, this was further stirred for 2 hours still at 20° C. to 30° C. Then, this was acidified with acetic acid added thereto, and ethanol was evaporated away under reduced pressure. The residue was cooled, and 46.2 g of 1,3,5-tris[3'-cyanopropyloxy]benzene was obtained. Its structure was confirmed through $^{13}$H-NMR.

<2>Production of Dendrimer (10)

Dendrimer (10) was produced in the same manner as in the steps <2> to <8> in Production Example 1, for which, however, 1,3,5-tris[3'-cyanopropyloxy]benzene was used in the step (2) in place of 1,4-diaminobutane-N,N'-tetra-1-propionitrile. Its structure was confirmed through $^{13}$C-NMR.

Production Example 4

Production of Metal Cluster-containing Dendrimers

Metal cluster-containing dendrimers were produced, which contain any of Fe/Pt, Fe/Pt/Ag and Au inside dendrimer (10) as in Table 1 below.

TABLE 1

| Metal Cluster-Containing Dendrimers | | | | | | | | | |
|---|---|---|---|---|---|---|---|---|---|
| | Dendrimer | | | | | | | | |
| Metal Cluster-Containing Dendrimer | Number | Numer of all N atoms | All Metal Atoms/All N Atoms | Metal Composition | | | | | |
| | | | | Fe | Pt | Au | Ag | Sn | |
| MD-1/10 | (10) | 93 | 42/93 | 20 | 20 | — | 2 | — | |
| MD-2/10 | (10) | 93 | 40/93 | — | — | 40 | — | — | |
| MD-3/10 | (10) | 93 | 41/93 | 20 | 20 | — | — | 1 | |

1) Production of MD-1/10:
a) Preparation of Metal Ion-dendrimer Complex:

In a 50-ml Erlenmeyer flask, 5.0 ml ($5.0 \times 10^{-5}$ mols) of aqueous 10 mM FeCl$_3$ solution, 5.0 ml ($5.0 \times 10^{-5}$ mols) of aqueous 10 mM H$_2$[PtCl$_4$] solution and 5.0 ml ($5.0 \times 10^{-6}$ mols) of aqueous 1 mM AgNO$_3$ solution were mixed, and the resulting mixture was transferred into a 20-ml dropping funnel.

"M" referred to herein is meant to indicate "mol/liter".

5.0 ml ($2.5 \times 10^{-6}$ mols) of aqueous 0.5 mM dendrimer (10) solution was put into a different 50-ml Erlenmeyer flask, and with stirring with a magnetic stirrer, the metal ion mixture prepared in the above was dropwise added to it at room temperature within 5 minutes. Then, this was kept static as it was for 12 hours.

The reaction mixture was transferred into a cellulose tube for dialysis (from VISKASE), and dialyzed against 300 ml of deionized water for 1 day. The dialysis was repeated two times.

Thus dialyzed, the metal ion-dendrimer complex was subjected to elementary analysis for nitrogen (with Perkin Elmer's Model 2400) and to atomic absorption analysis for metal ions (with Hitachi's Model Z5010). Thus measured, the data confirmed that the ratio of metal ion/N and the metal ion composition found correspond to those in Table 1.
b) Production of MD-1/10:

One drop of glacial acetic acid was added to the dialyzed metal ion-dendrimer complex/water, and bubbled with nitrogen gas for 3 hours. Then, the nitrogen atmosphere was still kept as such, a predetermined amount of sodium borohydride was added to it little by little, and the system was kept static for 1 hour to obtain MD-1/10.

Thus obtained, MD-1/10 was subjected to elementary analysis for nitrogen (with Perkin Elmer's Model 2400) and to atomic absorption analysis for metal ions (with Hitachi's Model Z5010). Thus measured, the data confirmed that the ratio of metal ion/N and the metal ion composition found correspond to those in Table 1.
2) Production of MD-2/10:
a) Preparation of Metal Ion-dendrimer Complex:

10.0 ml ($10.0 \times 10^{-5}$ mols) of aqueous 10 mM H$_2$[AuCl$_4$] solution prepared in a 50-ml Erlenmeyer flask was transferred into a 20-ml dropping funnel.

5.0 ml ($2.5 \times 10^{-6}$ mols) of aqueous 0.5 mM dendrimer (10) solution was put into a different 50-ml Erlenmeyer flask, and with stirring with a magnetic stirrer, the metal ion solution prepared in the above was dropwise added to it at room temperature within 5 minutes. Then, this was kept static as it was for 12 hours.

The reaction mixture was transferred into a cellulose tube for dialysis (from VISKASE), and dialyzed against 300 ml of deionized water for 1 day. The dialysis was repeated two times.

Thus dialyzed, the metal ion-dendrimer complex/water was subjected to elementary analysis for nitrogen (with Perkin Elmer's Model 2400) and to atomic absorption analysis for metal ions (with Hitachi's Model Z5010). Thus measured, the data confirmed that the ratio of metal ion/N found corresponds to that in Table 1.
b) Production of MD-2/10:

The dialyzed metal ion-dendrimer complex was bubbled with nitrogen gas for 3 hours. Then, the nitrogen atmosphere was still kept as such, a predetermined amount of sodium borohydride was added to it little by little, and the system was kept static for 1 hour to obtain MD-2/10.

Thus obtained, MD-2/10 was subjected to elementary analysis for nitrogen (with Perkin Elmer's Model 2400) and to atomic absorption analysis for metal ions (with Hitachi's Model Z5010). Thus measured, the data confirmed that the ratio of metal/N found corresponds to that in Table 1.
3) Production of MD-3/10:
a) Preparation of Metal Ion-dendrimer Complex:

In a 50-ml Erlenmeyer flask, 5.0 ml ($5.0 \times 10^{-5}$ mols) of aqueous 10 mM FeCl$_3$ solution, 5.0 ml ($5.0 \times 10^{-5}$ mols) of aqueous 10 mM H$_2$[PtCl$_4$] solution and 2.5 ml ($2.5 \times 10^{-6}$ mols) of aqueous 1 mM SnCl$_2$ solution were mixed, and the resulting mixture was transferred into a 20-ml dropping funnel.

5.0 ml ($2.5 \times 10^{-6}$ mols) of aqueous 0.5 mM dendrimer (10) solution was put into a different 50-ml Erlenmeyer flask, and with stirring with a magnetic stirrer, the metal ion mixture prepared in the above was dropwise added to it at room temperature within 5 minutes. Then, this was kept static as it was for 12 hours.

The reaction mixture was transferred into a cellulose tube for dialysis (from VISKASE), and dialyzed against 300 ml of deionized water for 1 day. The dialysis was repeated two times.

Thus dialyzed, the metal ion-dendrimer complex/water was subjected to elementary analysis for nitrogen (with Perkin Elmer's Model 2400) and to atomic absorption analysis for metal ions (with Hitachi's Model Z5010). Thus measured, the data confirmed that the ratio of metal ion/N and the metal ion composition found correspond to those in Table 1.

b) Production of MD-3/10:

One drop of glacial acetic acid was added to the dialyzed metal ion-dendrimer complex/water, and bubbled with nitrogen gas for 3 hours. Then, the nitrogen atmosphere was still kept as such, a predetermined amount of sodium borohydride was added to it little by little, and the system was kept static for 1 hour to obtain MD-3/10.

Thus obtained, MD-3/10 was subjected to elementary analysis for nitrogen (with Perlin Elmer's Model 2400) and to atomic absorption analysis for metal ions (with Hitachi's Model Z5010). Thus measured, the data confirmed that the ratio of metal ion/N and the metal ion composition found correspond to those in Table 1.

Example 1

A solution of a dendrimer, MD-1/10 was applied onto a silica glass disc having been optically polished and having a thickness of 1.2 mm, in a mode of controlled spin coating. The coating amount was 0.030 g/m$^2$ in terms of the solid dendrimer content. Thus coated, the disc was dried, and then heated in an argon atmosphere in an electric furnace at 450° C. for 20 minutes.

Next, a binder coating composition mentioned below was applied onto the dendrimer-coated disc in a mode of controlled spin coating. The coating amount was 0.002 g/m$^2$ in terms of the solid binder content.

"Parts" referred to hereinunder are by weight.

Binder Coating Composition:

| Polyurethane resin (Toyobo's UR8200 | 10 parts |
|---|---|
| Polyisocyanate | 1 part |
| Methyl ethyl ketone | 180 parts |
| Cyclohexanone | 180 parts |

The mixture of the above components was filtered through a filter having a mean pore size of 1 μm to prepare a binder coating composition.

The coated disc was dried, and then further coated with a nitrogen-added diamond-like carbon (DLC) protective film of C:H:N=62:29:7 (by mol) having a thickness of 10 nm, through RF plasma CVD using a reactive gas mixture of ethylene, nitrogen and argon.

Next, the protective film was further coated with a lubricant film having a thickness of 1 nm to complete a recording medium. Briefly, a perfluoropolyether-type lubricant (Ausimont's FOMBLIN Z-DOL) was dissolved in a fluorine-containing solvent (Sumitomo 3M's HFE-7200), and the resulting solution was filtered through a filter having a pore size of 0.1 μm. In this, the protective film-coated disc was dipped so as to be coated with the lubricant film.

The magnetic characteristics of the thus-fabricated recording medium were as follows:

1. Coercive Force, Hc:

Using a vibrating sample magnetometer (VSM), the coercive force of the recording medium was measured in an applied magnetic field of 800 kA/m. Thus measured, the coercive force Hc of the sample of Example 1 was 215 kA/m (2700 Oe).

2. C/N:

Using a G-MR head having a reproduction track width of 0.8 μm and a reproduction gap of 0.2 μm, the recoding medium was tried for recording and reproduction of a line-recording density of 220 kFCI. From the reproduced signal of 220 kFCI and the nose after DC erase, the ratio C/N was obtained. The relative speed of tape/head was 10 m/sec; and the head load was 29.4 mN (3 gf). The ratio C/N of the sample of Example 1 was 30 dB.

Example 2

An aluminium layer having a thickness of 300 nm was formed on a silica glass disc having been optically polished and having a thickness of 1.2 mm. Next, a solution of a dendrimer, MD-2/10 was applied onto the alumium-coated silica glass disc, in a mode of controlled spin coating. The coating amount was 0.010 g/m$^2$ in terms of the solid dendrimer content. Thus coated, the disc was dried, and then heated in an argon atmosphere in an electric furnace at 150° C. for 90 minutes.

The thus-coated disc was observed with AFM, and it was found that the dendrimer layer was a single layer of dendrimer grains and the grains were aligned in a mode of closed packing.

Next, a protective layer of silicon oxide was formed on it through sputtering. Its thickness was 10 nm. Next, the protective film was further coated with a lubricant film having a thickness of 1 nm to complete a recording medium. Briefly, a perfluoropolyether-type lubricant (Ausimont's FOMBLIN Z-DOL) was dissolved in a fluorine-containing solvent (Sumitomo 3M's HFE-7200), and the resulting solution was filtered through a filter having a pore size of 0.1 μm. In this, the protective film-coated disc was dipped so as to be coated with the lubricant film.

With the recording medium being rotated, a high voltage was pulsewise applied between a microelectrode and the electrode layer of the recording medium so that electrons could be implanted into the gold particles inside the dendrimer in the recording medium. This is for charge-based recording on the medium. The recording density was 300 gigabits/inch$^2$. In addition, using a micro-FET sensor, the charge presence in the recording medium was read out based on the change in the electric field intensity, and the CN ratio of the recording medium was 30 dB.

Example 3

A dispersion of a dendrimer, MD-3/10 was concentrated through an ultrafilter, then dried and ground into a dendrimer MD-3/10 powder. The dendrimer MD-3/10 powder was heated and annealed in an argon atmosphere in an electric furnace at 550° C. for 30 minutes. Thus annealed, this is a dendrimer, MD-30/10.

Magnetic Coating Composition (1):

| | |
|---|---|
| Dendrimer, MD-30/10 (solid content) | 100 parts |
| Vinyl chloride polymer, MR110 (from Nippon Zeon) | 12 parts |
| Polyurethane resin, UR8200 (from Toyobo) | 3 parts |
| Carbon black, #50 (from Asahi Carbon) | 5 parts |
| Butyl stearate | 10 parts |
| Stearic acid | 4 parts |
| Methyl ethyl ketone | 180 parts |
| Cyclohexanone | 180 parts |

Non-magnetic Coating Composition (1):

| | |
|---|---|
| Non-magnetic powder, α-$Fe_2O_3$ (having a mean major axis length of 0.15 μm, SBET of 50 m$^2$/g and pH of 9, and having 1% by weight of $Al_2O_3$ in its surface) | 80 parts |
| Sumikorandom AKP-50 (α-alumina, having a mean grain size of 0.15 μm) | 5 parts |
| Carbon black, Conductex SC-U (from Columbia Carbon) | 20 parts |
| Vinyl chloride polymer, MR110 (from Nippon Zeon) | 12 parts |
| Polyurethane resin, UR8200 (from Toyobo) | 5 parts |
| Phenylphosphonic acid | 4 parts |
| Butyl stearate | 10 parts |
| Stearic acid | 4 parts |
| Methyl ethyl ketone/cyclohexanone (7/3 mixed solvent) | 250 parts |

The above-mentioned coating compositions (magnetic coating composition (1) and non-magnetic coating composition (1)) were prepared as follows: The pigment, vinyl chloride polymer and phenylphosphonic acid were kneaded along with 50% of the solvent in a kneader, to which were added the polyurethane resin and the remaining other components. This was well dispersed in a sand mill. Polyisocyanate was added to the thus-obtained dispersion. Its amount added to the coating liquid for the undercoat layer was 15 parts, and that to he coating liquid for the magnetic layer was 14 parts. Further, 30 parts of cyclohexanone was added to each coating liquid. Thus prepared, the coating liquids were separately filtered through a filter having a mean pore size of 1 μm to be those for the undercoat layer and the magnetic layer.

Thus prepared, the magnetic coating composition (1) and the non-magnetic coating composition (1) was applied at the same time to a polyamide substrate (trade name: MICTRON) having a thickness of 4 μm and having a center face mean roughness of 2 nm to thereby form thereon an undercoat layer and a magnetic layer. Briefly, the non-magnetic coating composition was first applied to the substrate so that the dry thickness of the thus-formed undercoat layer could be 1.7 μm, and immediately after it, this was further coated with the magnetic coating composition (1) to form thereon a magnetic layer having a thickness of 0.05 μm. While the two layers were still wet thereon, the thus-coated substrate was exposed to magnetic power from a cobalt magnet of 600 mT for orientation, and further to magnetic power from a solenoid of 600 mT also for orientation. Then, the coating layers were dried and set.

After thus dried, the coated substrate was processed with a 7-stage calendar of metal rolls alone, at 95° C. And at a speed of 200 m/min. Then, this was coated with a back layer having a thickness of 0.5 μm. Briefly, 100 parts of carbon black having a mean grain size of 17 nm, 80 parts of calcium carbonate having a mean grain size of 40 nm and 5 parts of α-alumina having a mean grain size of 200 nm were dispersed in a mixture of nitrocellulose resin, polyurethane resin and polyisocyanate, and the resulting dispersion was applied onto the back of the coated substrate to form the back layer.

Next, this was slit into tapes each having a width of 8.0 mm. Thus fabricated, the magnetic tape was set in a tape-cleaning apparatus equipped with a tape-feeding unit and a tape-winding unit, in such a manner that a nonwoven fabric and an polishing tape could be pressed against the magnetic face of the magnetic tape. In that condition, the surface of the magnetic layer of the magnetic tape was cleaned. Through the process, a magnetic tape (recoding medium) of this Example was obtained.

Its characteristics were as follows:

1. Coercive Force, Hc:

Using a vibrating sample magnetometer (VSM), the coercive force of the recording medium was measured in an applied magnetic field of 800 kA/m. Thus measured, the coercive force Hc of the sample of Example 3 was 199 kA/m (2500 Oe).

2. C/N:

The electromagnetic conversion characteristic of the sample was determined as follows: On a data-recording 8-mm deck, mounted were an MIG head (head gap of 0.2 μm; track width of 17 μm; saturation magnetic flux density of 1.5 T; azimuth angle of 20), and a reproduction MR head (SAL bias; MR device of Fe-Ni; track width of 6 μm; gap length of 0.2 μm; azimuth angle of 20). Along the MIG head, the magnetic tape to be tested was run at a relative speed to the head of 10.2 m/sec. From the input-output characteristic of ½Tb (λ=0.5 μm), the optimum recording current was determined. With the thus-determined optimum recording current being applied to the apparatus, information data were recorded on the recording medium running along the MIG head, and then reproduced from it running along the MR head. The C/N ratio is defined to include the range from the reproduction carrier peak to the demagnetization noise, and the resolution band width of the spectral analyzer was 100 kHz. Thus measured, the C/N ratio of the recording medium of Example 3 was 48 dB.

As described in detail hereinabove with reference to its preferred embodiments, the recording medium that the present invention provides herein has a recording layer which contains spherical inorganic grains of a metal, an intermetallic compound, an alloy, a metal chalcogenide or the like and in which the spherical inorganic grains do not aggregate but are isolated from each other and the distance between the neighboring spherical inorganic grains is specifically controlled.

What is claimed is:

1. A recording medium comprising a substrate and a recording layer disposed on the substrate, the recording layer including spherical grains, which have a substantially uniform grain size and include inorganic grains, wherein the spherical grains include a dendrimer, wherein the dendrimer contains a π-conjugated polyarylazomethine that has a branched structure.

2. The recording medium according to claim 1, wherein the inorganic grains are substantially monodispersed and have a grain size of at most 10 nm.

3. The recording medium according to claim 1, further comprising an undercoat layer disposed between the substrate and the recording layer, the undercoat layer including a material, which has substantially no information recording ability.

4. The recording medium according to claim 1, wherein the dendrimer comprises a structure capable of coordinating with a metal.

5. The recording medium according to claim 1, wherein the dendrimer includes at least one of trimethyleneimine and amidamine.

6. The recording medium according to claim 1, wherein the π-conjugated polyarylazomethine is branched except in an aromatic ring moiety thereof.

7. The recording medium according to claim 1, wherein the spherical grains contain a functional group capable of forming a covalent bond with at least one of other spherical grains, an organic material other than said other spherical grains, and an inorganic material other than said other spherical grains.

8. The recording medium according to claim 1, wherein the inorganic grains contain at least one selected from the group consisting of a metal, an intermetallic compound, an alloy, a metal chalcogenide and a magnetic material.

9. The recording medium according to claim 8, wherein the metal is selected from the group consisting of Co, Fe and Ni.

10. The recording medium according to claim 8, wherein the metal is selected from the group consisting of Au, Pd and Pt.

11. The recording medium according to claim 8, wherein the intermetallic compound comprises an element selected from the group consisting of Co, Fe, Ni, Cr, Mn, Sm, Nd, Pd, Pt and B.

12. The recording medium according to claim 8, wherein the alloy is a binary alloy or a ternary alloy, of elements selected from the group consisting of Co, Fe, Ni, Cr, Mn, Sm, Nd, Pd, Pt and B.

13. The recording medium according to claim 8, wherein the alloy is selected from the group consisting of Sb—Se, Sb—Te, Ga—Se, Te—Se, Te—Se—Sb, Te—Ga—Se, Te—Ge—Sn, Te—As—Ge, and Ge—Sb—Te.

14. The recording medium according to claim 8, wherein the metal chalcogenide is an Fe oxide containing at least one of Co and Ni.

15. The recording medium according to claim 8, wherein the magnetic material is selected from barium ferrite and strontium ferrite.

16. The recording medium according to claim 1, wherein a protective layer is disposed on the recording layer.

17. The recording medium according to claim 1, wherein the substrate contains a material selected from the group consisting of polyesters, polyolefins, cellulose triacetate, polycarbonate, polyamide, polyimide, polyamidimide, polysulfone, polybenzoxazole, aluminium and glass, and has, on a surface thereof, a polar group selected from the group consisting of —OH, —COOH, —NH$_2$, —CONH$_2$, —SO$_3$H, and —PO$_3$H.

18. A recording medium comprising a substrate and a recording layer disposed on the substrate, the recording layer including spherical grains, which have a substantially uniform grain size and include inorganic grains, wherein the spherical grains include a dendrimer, wherein the dendrimer comprises at least one selected from the group consisting of the following compounds (1) to (10):

Dendrimer (1):

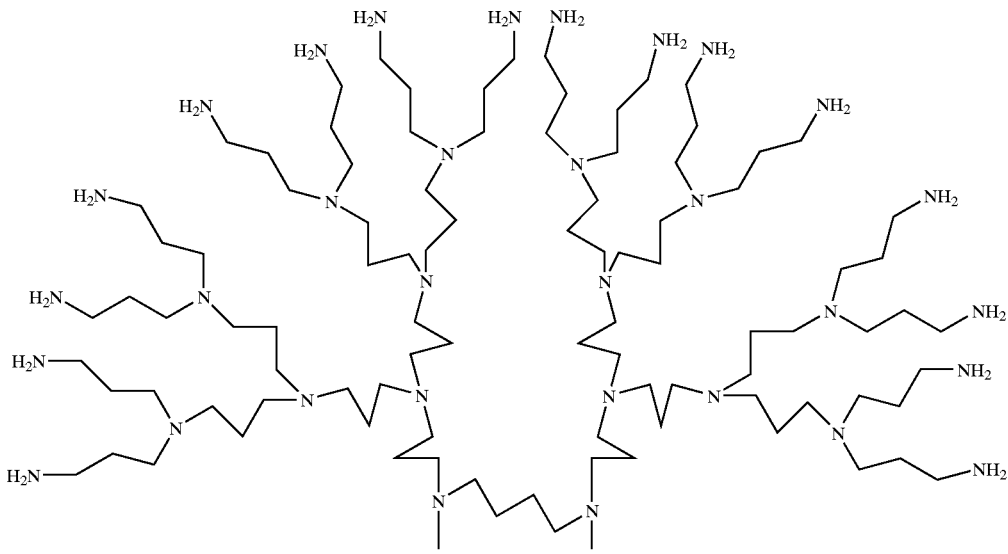

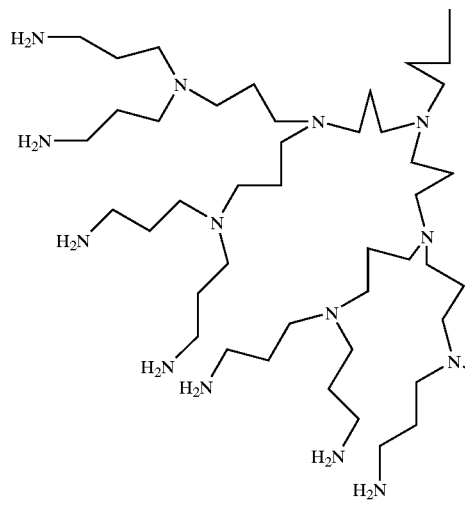
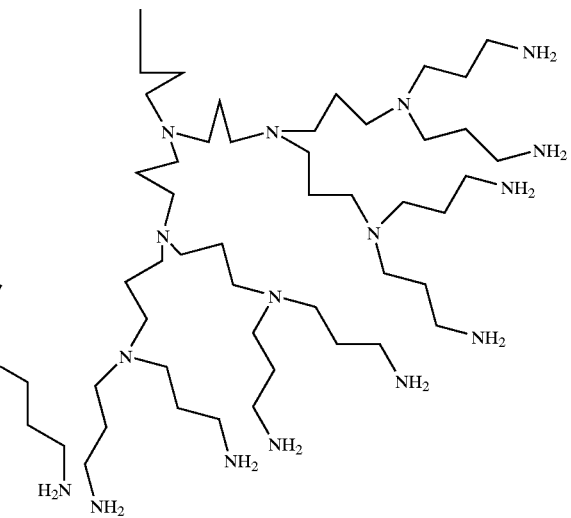
Dendrimer (2):
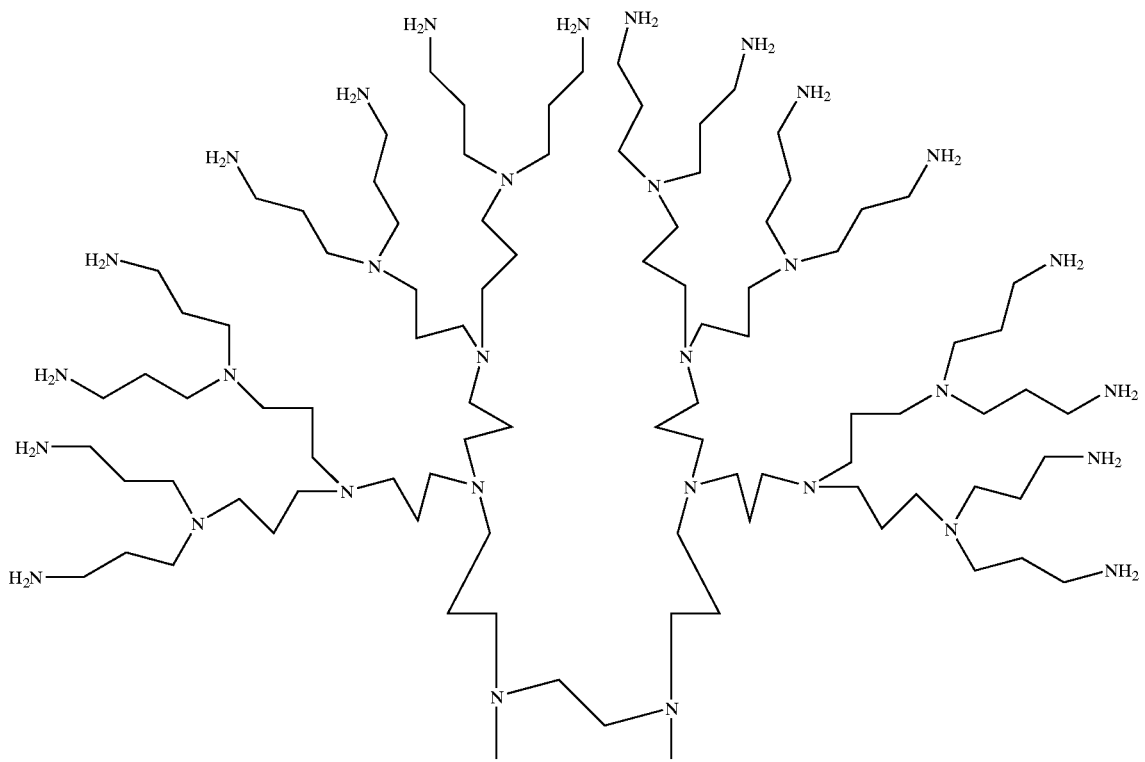

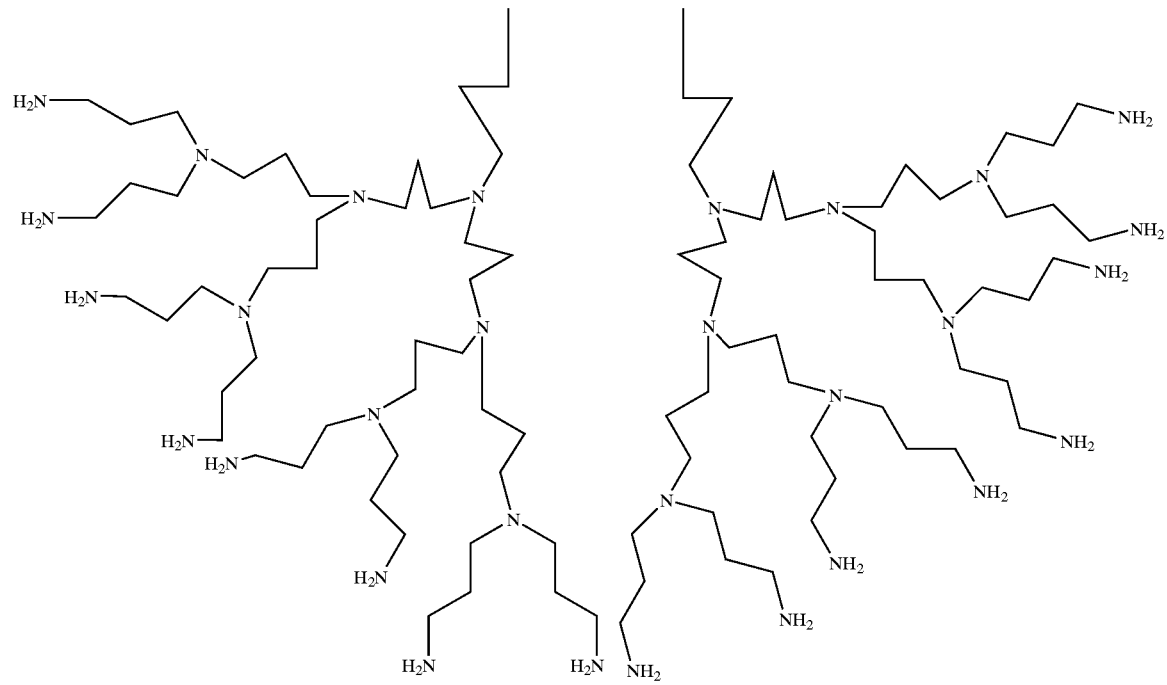
Dendrimer (3):
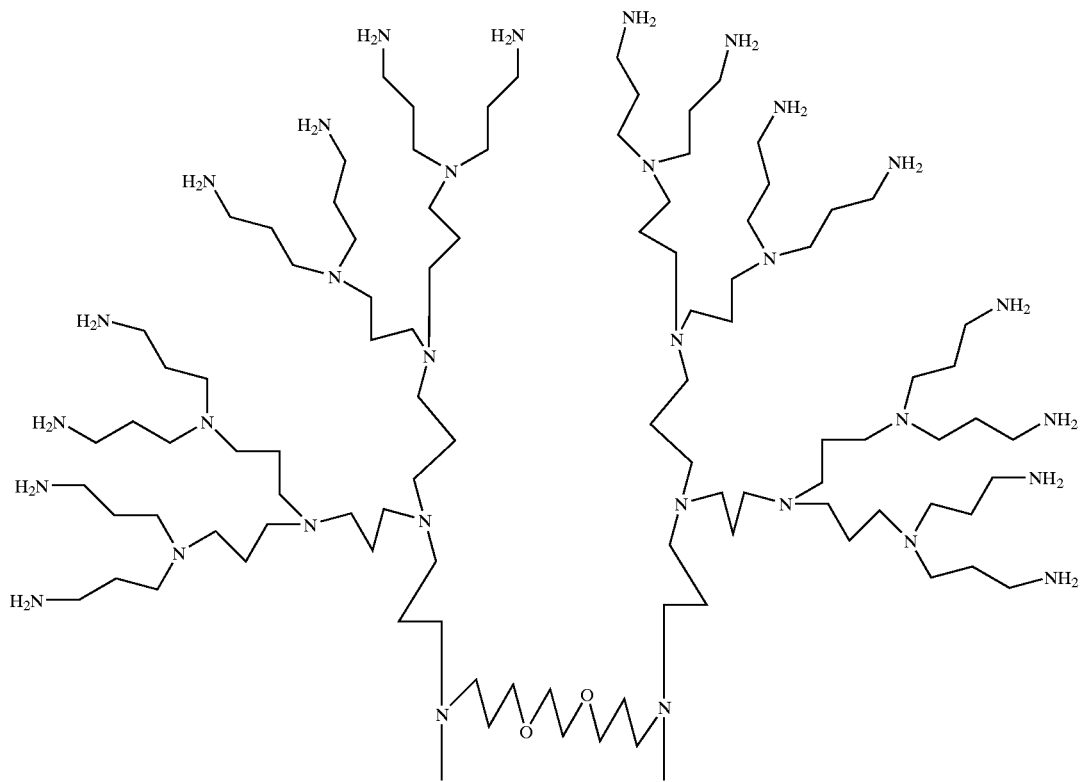

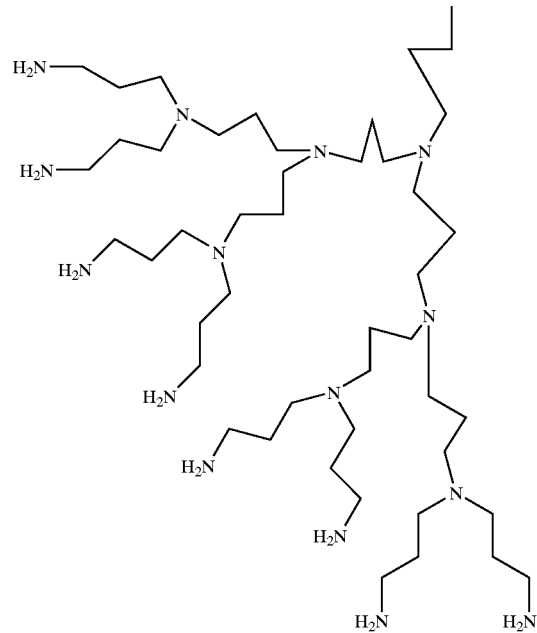
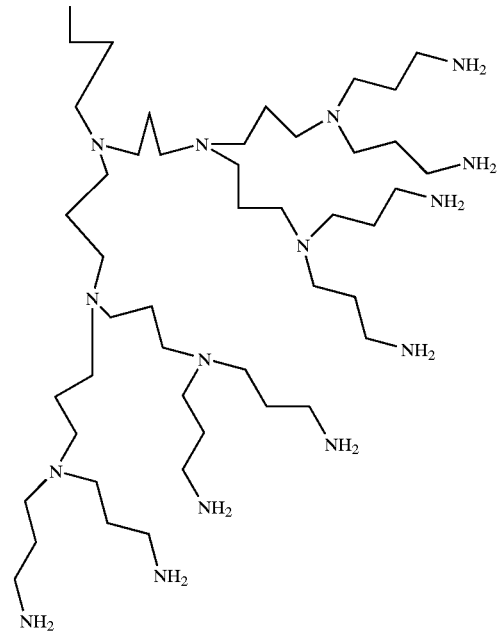
Dendrimer (4):
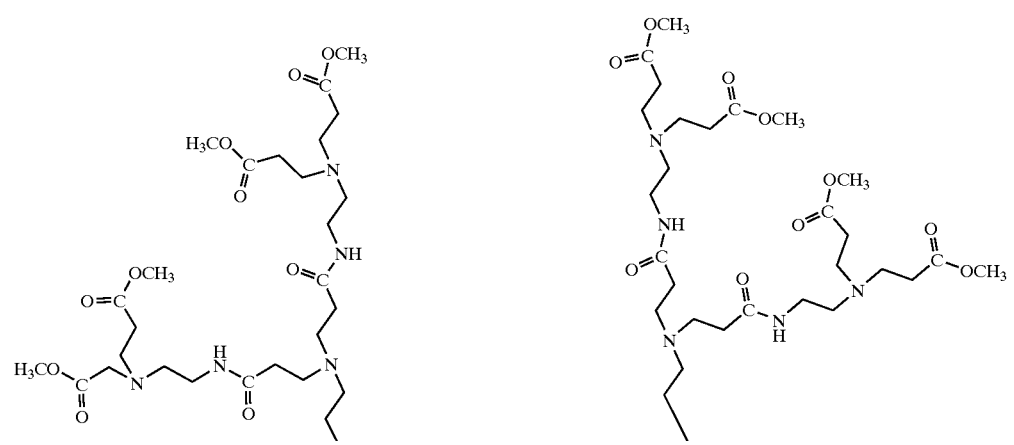

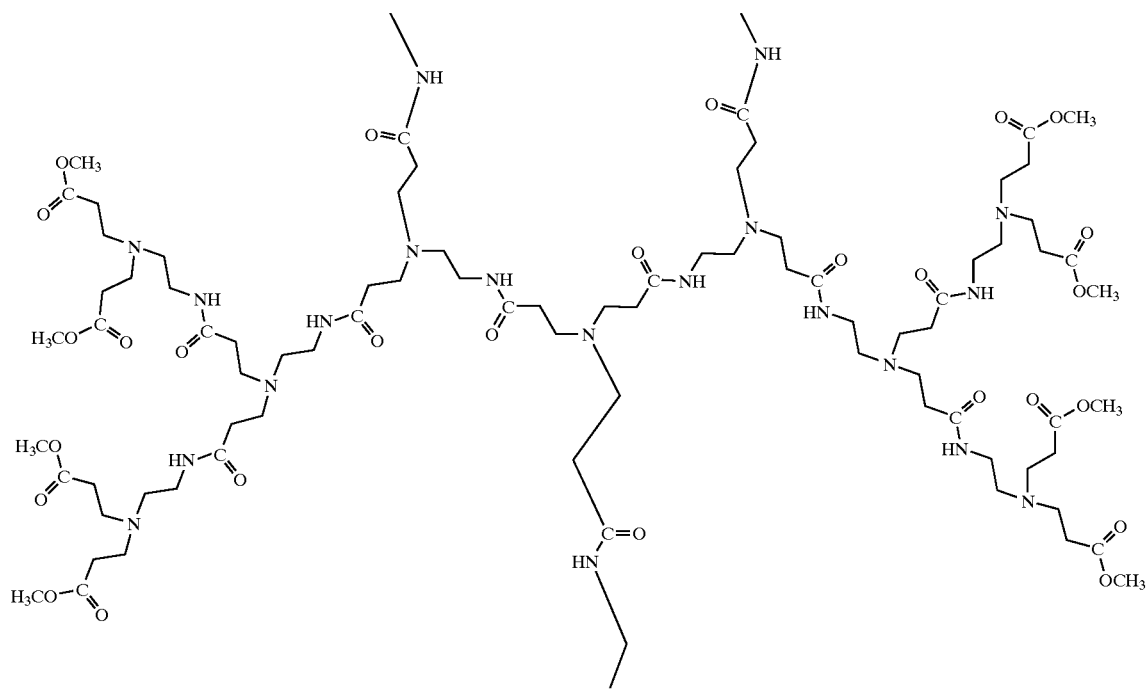
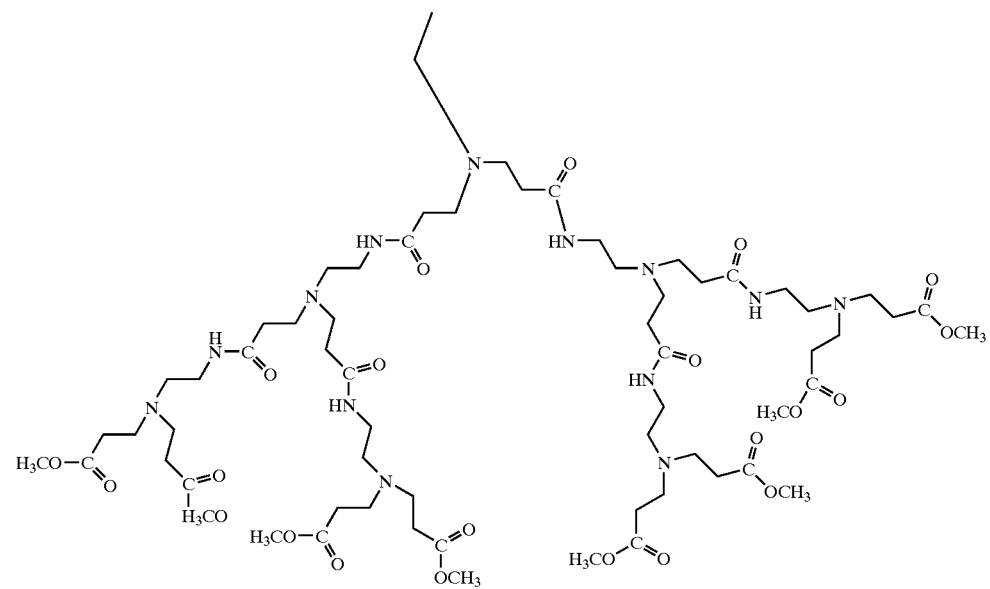

Dendrimer (5):
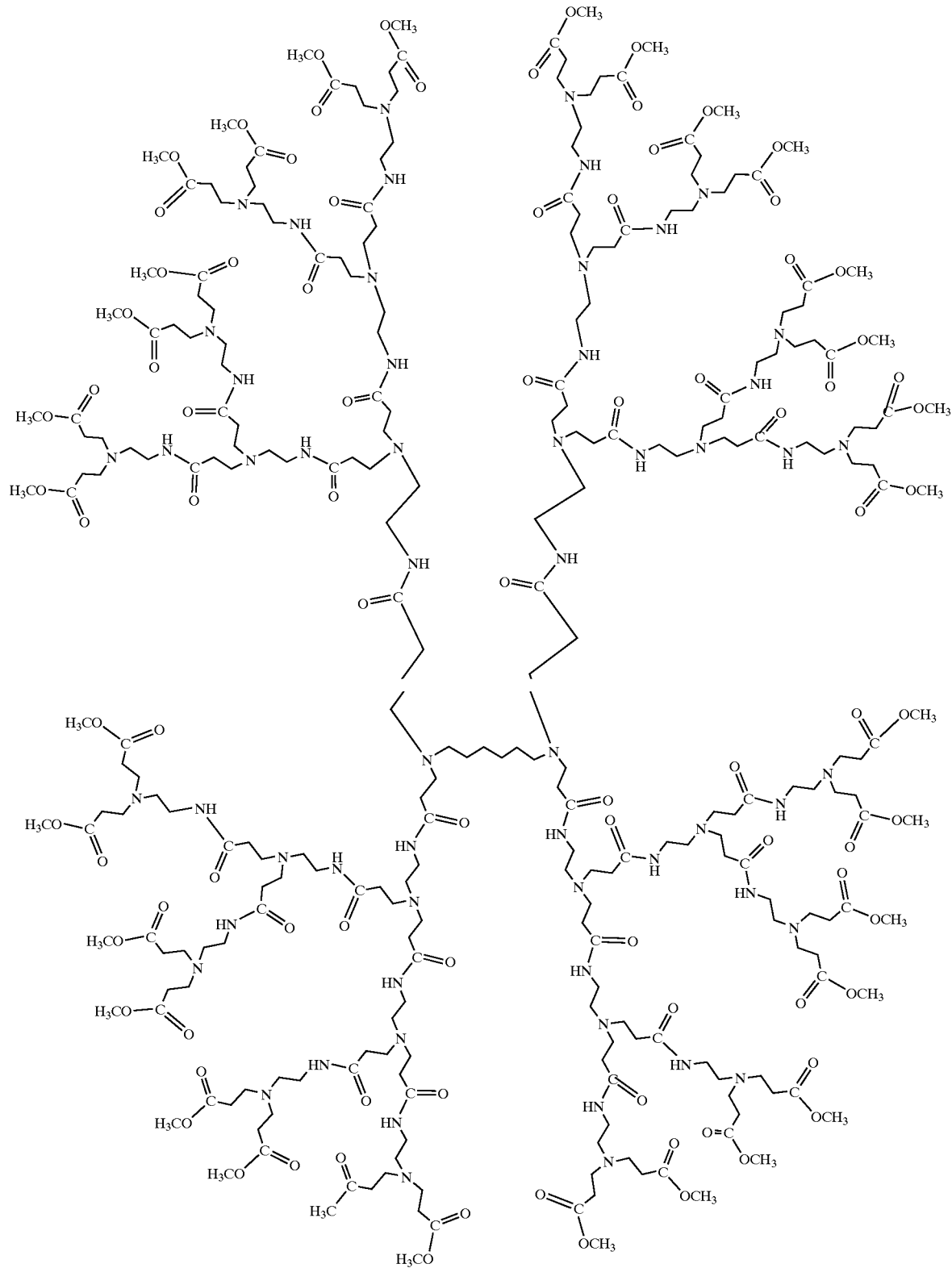

Dendrimer (6):
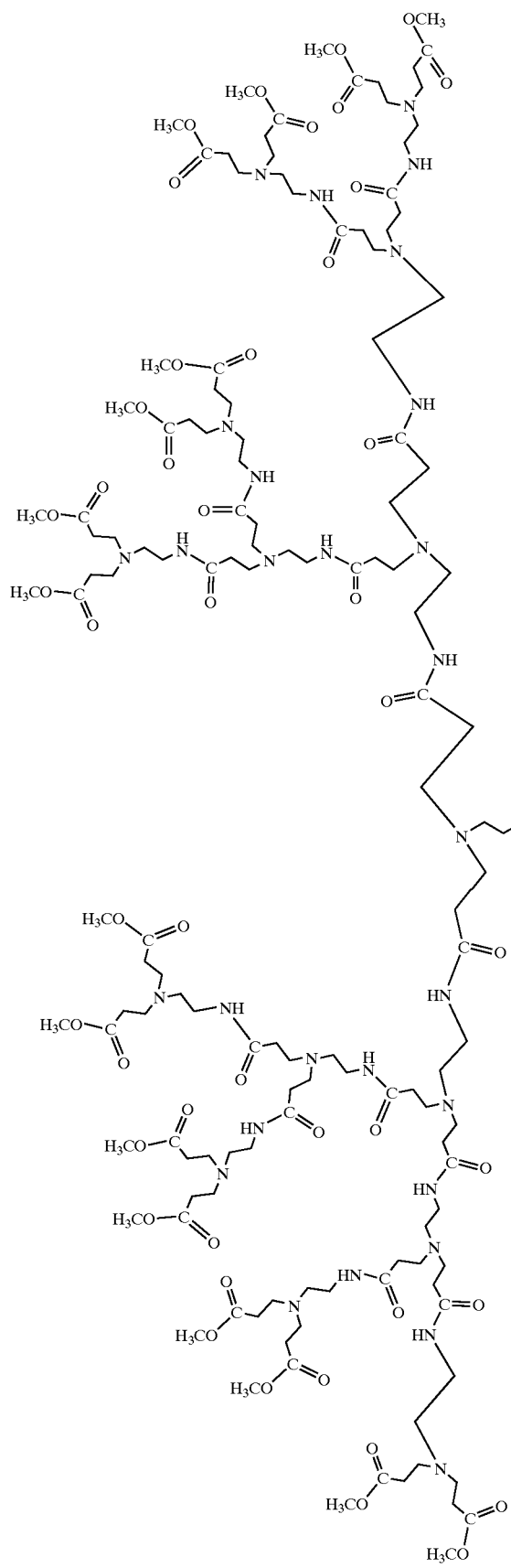
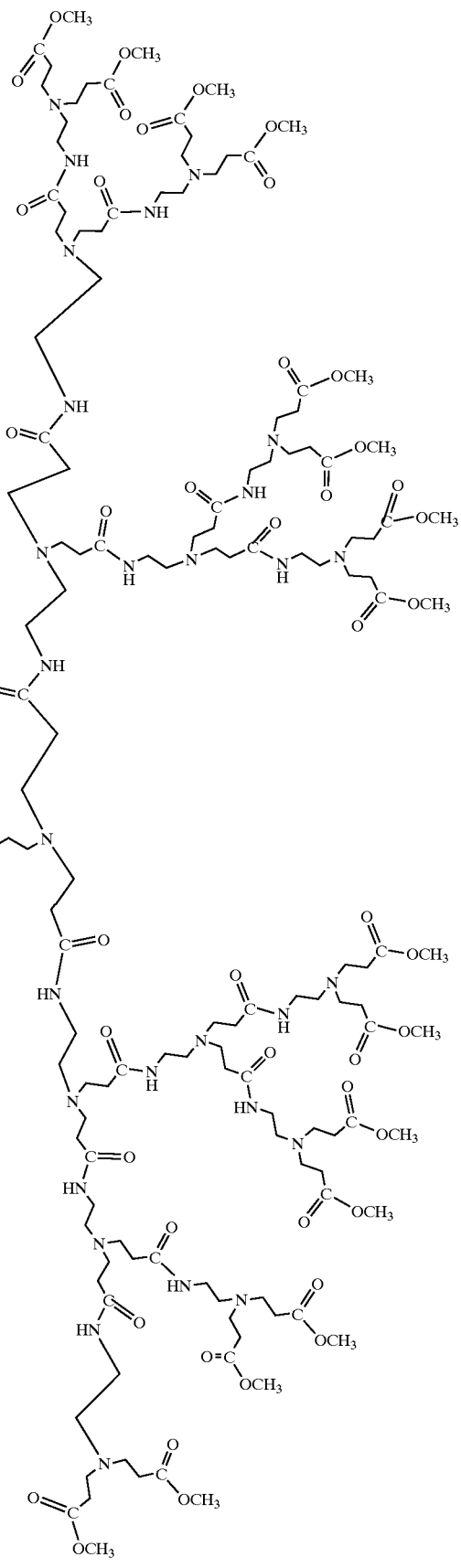

Dendrimer (7):
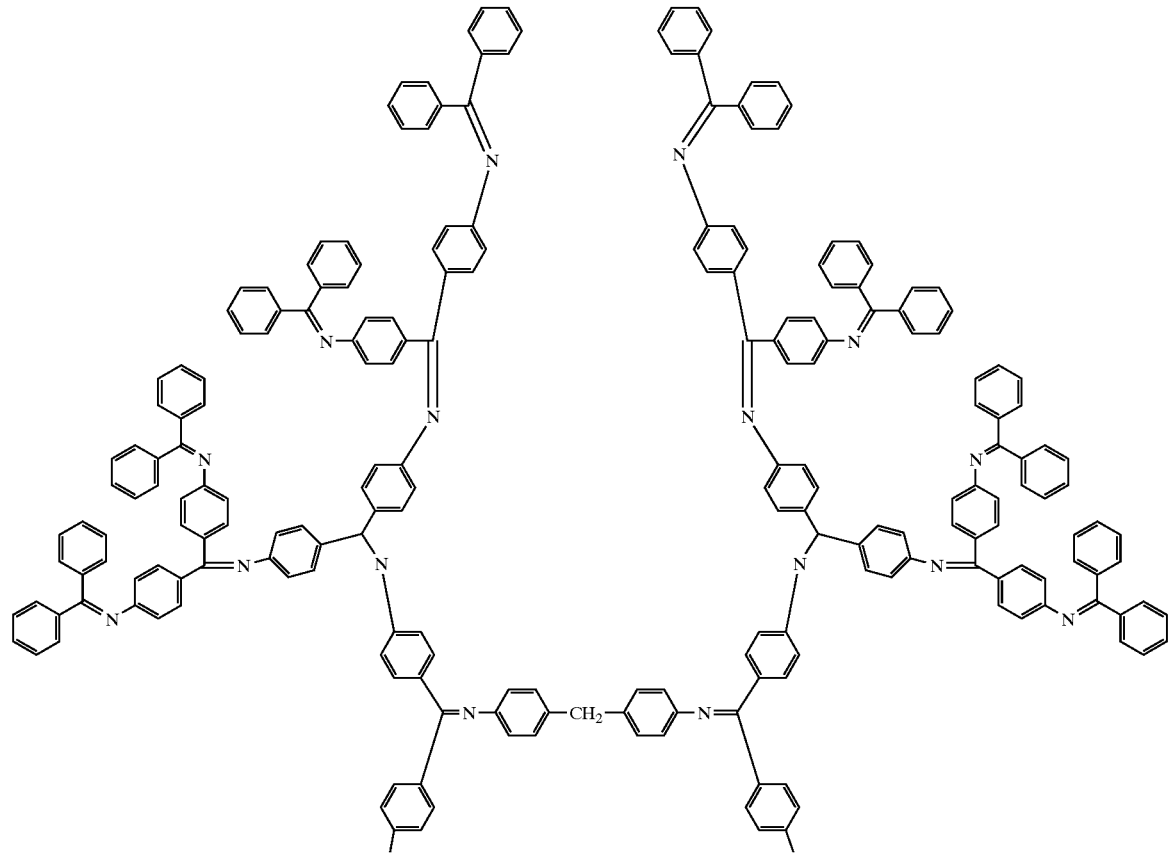
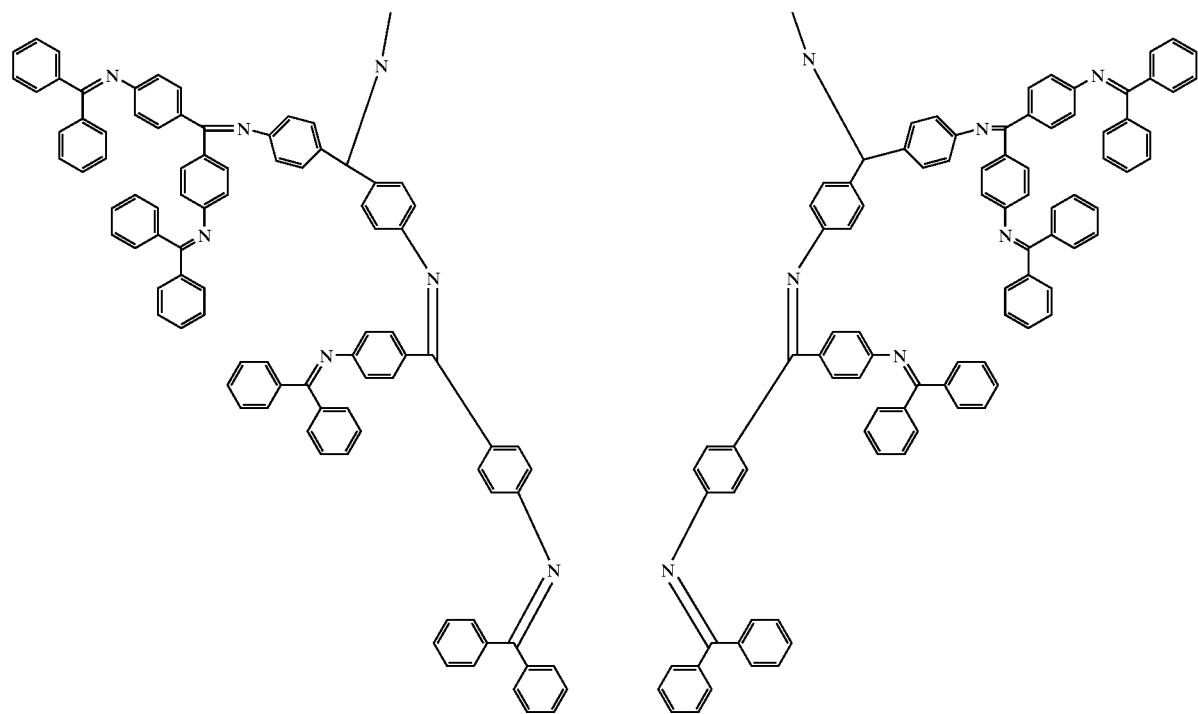

Dendrimer (8):
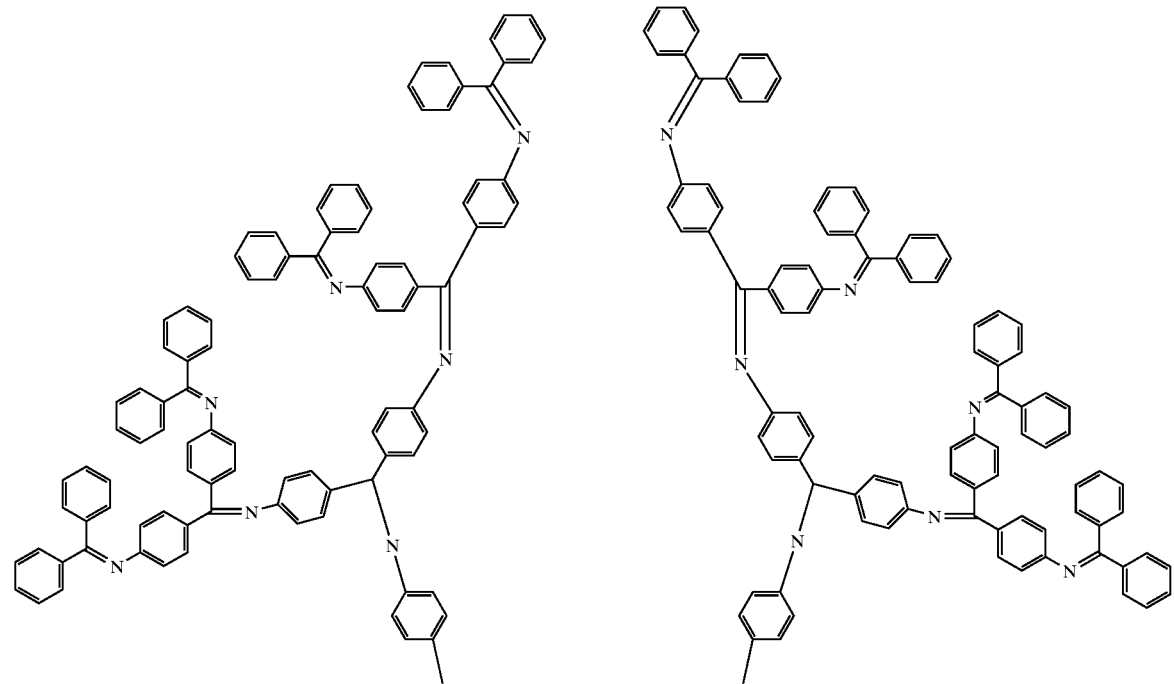
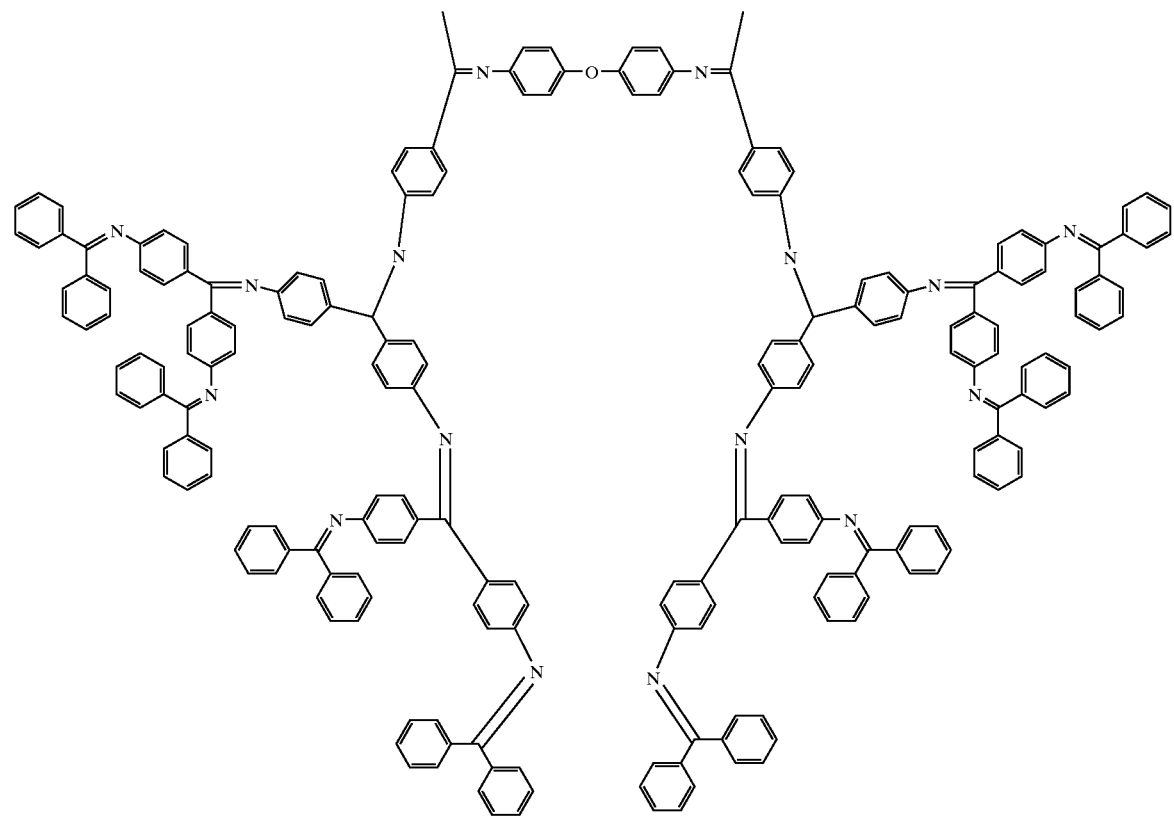

Dendrimer (9):
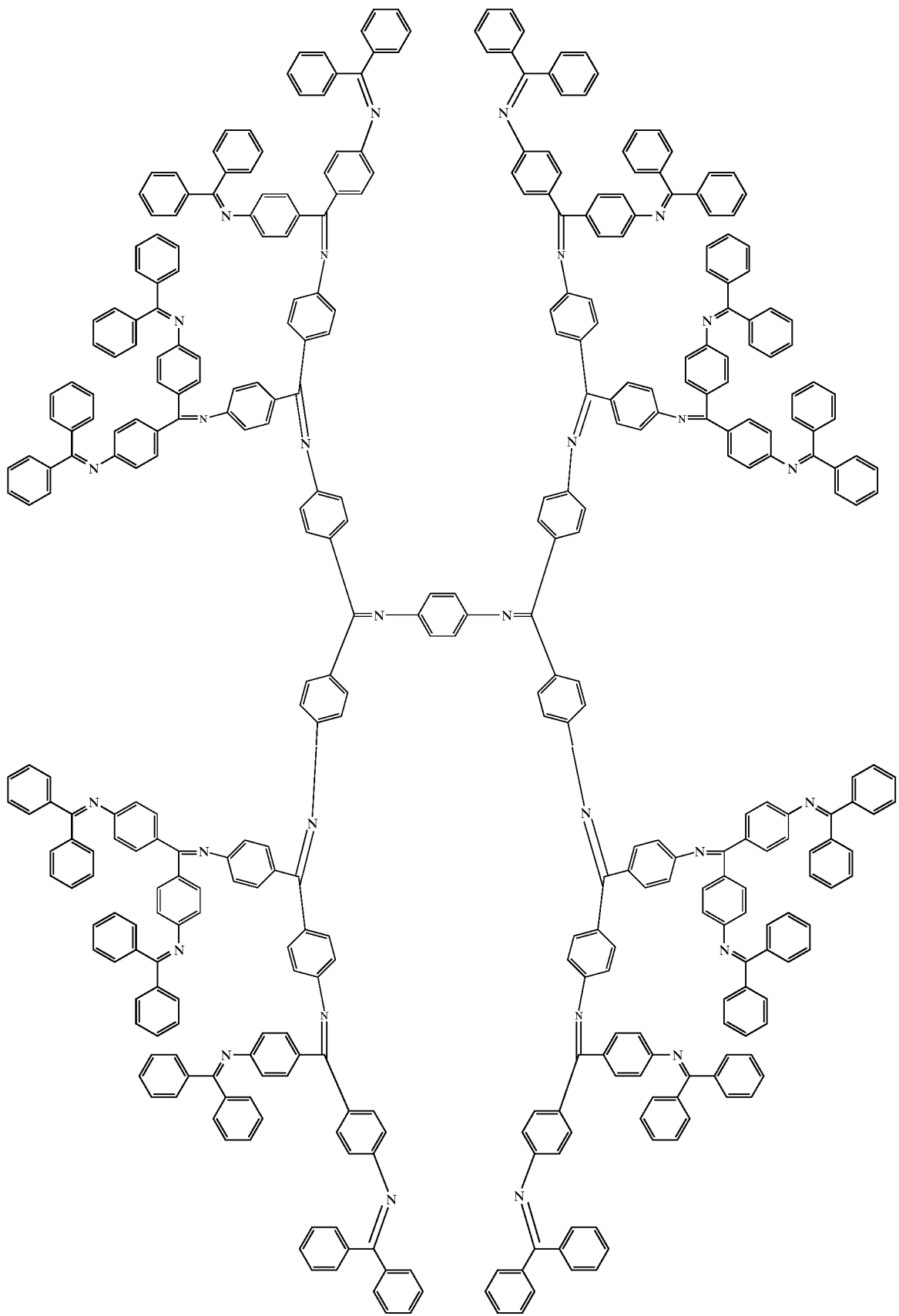

Dendrimer (10):
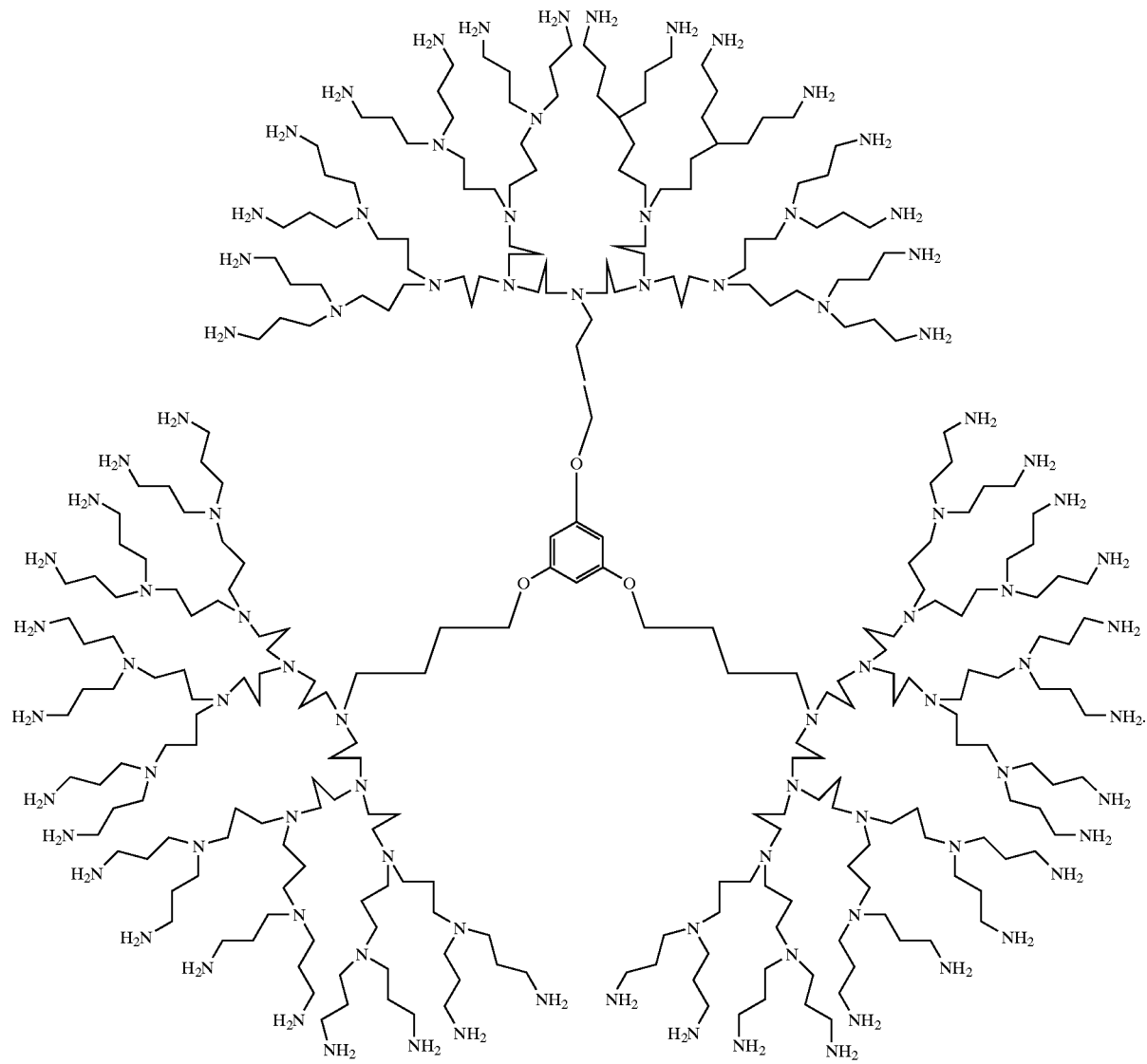
* * * * *